United States Patent
Bromer

(10) Patent No.: US 9,547,438 B2
(45) Date of Patent: Jan. 17, 2017

(54) GESTURE BASED USER INTERFACE FOR AUGMENTED REALITY

(75) Inventor: Nicholas S. Bromer, Marietta, PA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 193 days.

(21) Appl. No.: 13/320,904

(22) PCT Filed: Jun. 21, 2011

(86) PCT No.: PCT/US2011/041173
§ 371 (c)(1),
(2), (4) Date: Nov. 16, 2011

(87) PCT Pub. No.: WO2012/177237
PCT Pub. Date: Dec. 27, 2012

(65) Prior Publication Data
US 2012/0326961 A1    Dec. 27, 2012

(51) Int. Cl.
G06F 3/0488    (2013.01)
G06F 3/044    (2006.01)

(52) U.S. Cl.
CPC ........... *G06F 3/04886* (2013.01); *G06F 3/044* (2013.01); *G06F 2203/04108* (2013.01)

(58) Field of Classification Search
CPC ................... G06F 3/04886; G06F 2203/04108
See application file for complete search history.

(56) References Cited

U.S. PATENT DOCUMENTS

| 4,524,348 A | 6/1985 | Lefkowitz |
| 5,790,107 A * | 8/1998 | Kasser ................... G06F 3/044 178/18.06 |
| 6,545,614 B1 | 4/2003 | Kasai |
| 2002/0101546 A1* | 8/2002 | Sharp .................. G02B 27/288 348/760 |
| 2005/0002158 A1* | 1/2005 | Olodort et al. ............... 361/683 |

(Continued)

FOREIGN PATENT DOCUMENTS

| CN | 101981532 A | 2/2011 |
| JP | 11-194882 | 7/1999 |

(Continued)

OTHER PUBLICATIONS

International Search Report and Written Opinion for PCT/US11/41173, dated Oct. 20, 2011, 14 pages.

(Continued)

*Primary Examiner* — Temesghen Ghebretinsae
*Assistant Examiner* — Lisa Landis
(74) *Attorney, Agent, or Firm* — Amin, Turocy & Watson, LLP

(57) ABSTRACT

Technologies are generally described for systems and methods effective to provide a gesture keyboard that can be utilized with a virtual display. In an example, the method includes receiving sensory information associated with an object in proximity to, or in contact with, an input device including receiving at least one level of interaction differentiation detected from at least three levels of interaction differentiation, interpreting a command from the sensory information as a function of the at least one level of interaction differentiation, and outputting an action indication based on the command.

38 Claims, 12 Drawing Sheets

(56) References Cited

U.S. PATENT DOCUMENTS

| | | | |
|---|---|---|---|
| 2006/0034499 A1* | 2/2006 | Shinoda et al. | 382/124 |
| 2006/0192690 A1 | 8/2006 | Philipp | |
| 2007/0273561 A1 | 11/2007 | Philipp | |
| 2008/0007434 A1 | 1/2008 | Hristov | |
| 2008/0042989 A1* | 2/2008 | Westerman | G06F 3/0235 345/173 |
| 2008/0048997 A1 | 2/2008 | Gillespie et al. | |
| 2009/0009491 A1 | 1/2009 | Grivna | |
| 2009/0243997 A1* | 10/2009 | Tierling | G06F 3/016 345/156 |
| 2009/0251422 A1 | 10/2009 | Wu et al. | |
| 2009/0265670 A1* | 10/2009 | Kim | G06F 3/04883 715/863 |
| 2009/0289818 A1 | 11/2009 | Hou et al. | |
| 2010/0066391 A1 | 3/2010 | Hirasaka et al. | |
| 2010/0066696 A1* | 3/2010 | Yang | G06F 1/3231 345/173 |
| 2010/0103137 A1* | 4/2010 | Ciesla et al. | 345/174 |
| 2010/0245135 A1 | 9/2010 | Camacho et al. | |
| 2010/0253629 A1 | 10/2010 | Orsley | |
| 2010/0295559 A1 | 11/2010 | Osoinach | |
| 2011/0095997 A1* | 4/2011 | Philipp | G06F 3/044 345/173 |
| 2012/0133587 A1* | 5/2012 | Edwards | 345/168 |
| 2012/0188200 A1* | 7/2012 | Roziere | G06F 3/044 345/174 |

FOREIGN PATENT DOCUMENTS

| | | | |
|---|---|---|---|
| JP | 2007-149028 | | 6/2007 |
| JP | 2008-117371 | | 5/2008 |
| JP | 2010-092419 | | 4/2010 |
| WO | 2006133593 | | 12/2006 |
| WO | WO2011/015794 | * | 2/2011 |

OTHER PUBLICATIONS

Jennifer Graham, "New Round of tablet PCs coming to Consumer Electronics Show", USA Today, Jan. 3, 2011—http://www.usatoday.com/tech/products/2011-01-03-tablets-ces_N.htm, last accessed Nov. 2, 2011.

"Apple—iPad 2—Make your iPad even better with accesories"—http://www.apple.com/ipad/accessories/, last accessed Nov. 2, 2011.

Brother Industries, Ltd., News Release dated Jul. 21, 2010—http://www.brother.com/en/news/2010/airscouter/index.htm—last accessed Nov. 2, 2011.

Schowengerdt et al., "True 3-D scanned voxel displays using single or multiple light sources", presented at 2005 SID Int. Symposium held May 24-27, 2005 in Boston, MA. http://www.optics.arizona.edu/opti588/Presentation/MultiFocalPlaneDisplay/Seibel_JSID06_True%203D.pdf.

Christoph Wasshuber, "A.3 Capacitance of Two Spheres", http://www.iue.tuwien.ac.at/phd/wasshuber/node77.html, last accessed Nov. 2, 2011.

Christoph Wasshuber, "A.4 Capacitance of an Arbitrary Arrangement of Spheres", http://www.iue.tuwien.ac.at/phd/wasshuber/node78.html, last accessed Nov. 2, 2011.

Carl Zeiss AG, "Carl Zeiss cinemizer plus", http://www.zeiss.com/cinemizer, last accessed Nov. 16, 2011.

"Spherical Capacitor"—http://hyperphysics.phy-astr.gsu.edu/hbase/electric/capsph.html, last accessed Jan. 2, 2011.

Lee, et al. "Augmented Reality Keyboard System Using HMD", Korea Information Science Society and Human-Computer Interaction Research Group Conference Proceedings (HCI) 2003, vol. 2, 2003.2, 335-339 (5 pages).

* cited by examiner

GESTURE BASED USER INTERFACE FOR AUGMENTED REALITY

CROSS-REFERENCE TO RELATED APPLICATION

The present application is a U.S. national stage application under 35 U.S.C. §371 of PCT Application Serial No. PCT/US11/41173, filed Jun. 21, 2011, and entitled "GESTURE BASED USER INTERFACE FOR AUGMENTED REALITY," the disclosure of which is incorporated herein by reference in its entirety.

TECHNICAL FIELD

The subject disclosure relates generally to a gesture keyboard, e.g., to a gesture based user interface for augmented reality.

BACKGROUND

As the uses and complexity of computing systems have evolved, so has the desire to provide a computing system that is easy to operate and enjoyable for the user. Many computing systems employ a keyboard and a display. As input is entered into the keyboard, a corresponding output can be presented on the display. Some of the input is entered as a command for a corresponding action to be output. However, the entering of commands has traditionally been through the keyboard and/or a mouse and can be cumbersome to implement. For example, to input some commands, in some instances, multiple keys on the keyboard are depressed in a certain order, or else the desired input is not achieved.

Some computing systems utilize a touch-screen for the entry of commands. However, the touch-screen makes use of a 2-dimensional input space, which cannot make use of the 3-dimensional space above the touch surface. Therefore, motions by a user toward or away from the touch-screen do not have any effect. Further, in some computing systems, the keyboard is separate from the display, such that commands related to typing, e.g., shift lock, cursor movements, and so forth, are not practical to place within the display. This is because the display is too far away from the keypad, and thus, a user's hand(s) move too far to enter such commands.

The above-described deficiencies of conventional approaches to gesture-based computing systems are merely intended to provide an overview of some of the problems of conventional approaches and techniques, and are not intended to be exhaustive. Other problems with conventional systems and techniques, and corresponding benefits of the various non-limiting embodiments described herein may become further apparent upon review of the following description.

SUMMARY

In various, non-limiting embodiments, a gesture keyboard is disclosed which is configured to recognize commands, input in the form of gestures and/or as typing, and implement one or more actions based on the commands. In an example, the one or more actions can be implemented in an augmented reality. The gesture keyboard includes keys that type when pressed and can also sense fingers that are near the keyboard or in contact with the keyboard. The fingers can be sensed by their capacitance. The contact with the keyboard can be sensed by electrical contact between the finger and the key. The electrical-contact finger detection can be used to highlight a virtual keyboard that is displayed in virtual-reality spectacles, which can also show the text being typed. The capacitive sensing can be used to detect gestures by fingers near the keyboard and the gestures can be used for typing commands.

In one embodiment, a method includes receiving sensory information associated with an object in proximity to, or in contact with, an input device including receiving at least one level of interaction differentiation detected from at least two levels of interaction differentiation, interpreting a command from the sensory information as a function of the at least one level of interaction differentiation, and outputting an action indication based on the command.

In another embodiment, a system includes an environmental capture component configured to receive at least one gesture within a space relative to a keyboard, an interpretation component configured to identify a command based on the at least one gesture, and an output component configured to render information of the at least one gesture and a result of the command, in which the information is configured to be rendered on a virtual display.

In an additional embodiment, a computer-readable storage medium is described having stored thereon computer-executable instructions that, in response to execution, cause a computing device to perform operations, including detecting a gesture that indicates at least one command to be performed, interpreting the gesture as the at least one command selected from a plurality of commands, and initiating a result of the at least one command as a perceivable event within a virtual space.

In yet another embodiment, a system includes means for receiving an input in a form of a gesture, means for translating the gesture into a command selected from a set of alternative commands as a function of one or more of a proximity level, an electrical continuity level, and an actuation level, and means for outputting a result of the command, in a perceivable format, to a remote display device.

Still another embodiment is a computing device that includes a keyboard that includes an array of keys, in which at least a subset of keys of the array of keys include a respective displacement actuated switch configured to detect pressure applied to a respective key of at least the subset of keys, and at least one capacitive sensor configured to detect a finger near the keyboard.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

Various non-limiting embodiments are further described with reference to the accompanying drawings in which.

DETAILED DESCRIPTION

Overview

Figure 1:
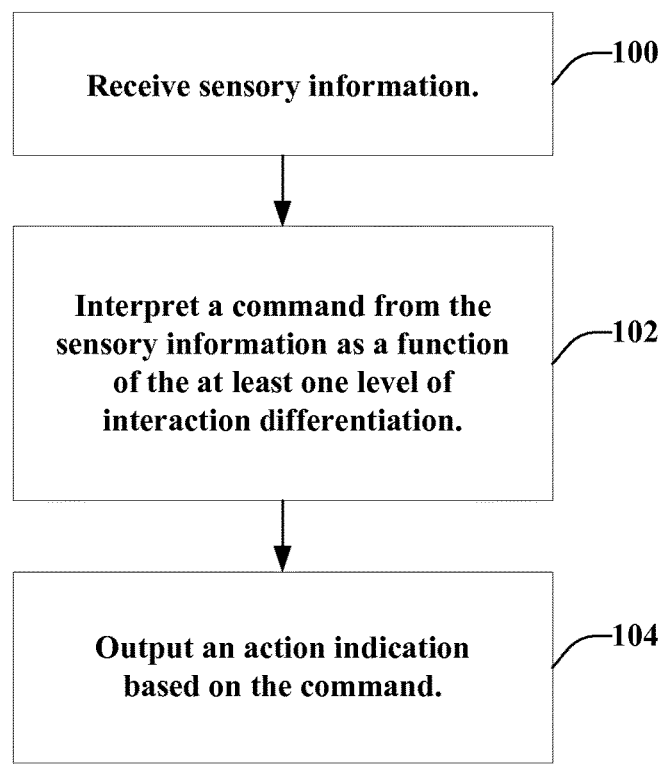
FIG. 1 shows a flow diagram illustrating an example, non-limiting embodiment of a method for recognizing and implementing commands.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the disclosure, as generally described herein, and illustrated in the Figures, can be arranged, substituted, combined, separated, and designed in a wide variety of different configurations, all of which are explicitly contemplated herein.

Commands that are delivered to computer systems by way of combined display and touch screens are increasingly used. Originally, these commands were limited to selecting an icon by pushing the screen (e.g., with a fingertip) at a location on the screen where the icon was displayed. Recently, phones, computers, tablets, and other devices have incorporated advanced features, such as use of a sweeping motion across the touch surface to move a display laterally or vertically, rotation of two fingers against the screen to rotate the displayed image, and radial motions to compress or expand a displayed image. These commands are popular because the commands employ natural intuitive actions, and the results can mimic real objects by adding virtual mass and virtual friction to the display, for example. However, these new commands have certain limitations. For example, because the commands can only be related to the display, the commands can only affect the display itself, and, therefore, their application is limited.

As alluded to above, a large amount of time spent on computing devices today is spent typing from the user's standpoint. Usually, the keyboard is separate from the display, such that commands related to typing (e.g., shift lock, cursor movements, and so forth) are not practical to place within the display. This is because the display is too far away from the user's physical input, e.g., farther than the keys that are currently being used by the user. In some cases, the mouse pad, which is typically located near the user's thumbs in a laptop, can be used for similar commands because the hands do not need to move far. However, the new commands that have been evolving in the context of touch-screens in 2-dimensional screen space (e.g., sweeping motion, rotation, radial motion) are not suited to typing motions on a mouse pad or tablet.

Further, these new touch-screen commands cannot make use of the space above the touch surface, so that motions toward or away from the touch screen do not have any effect. Additionally, these new touch-screen commands are based on hardware that may soon become obsolete, namely, the display. For instance, it is anticipated that displays will be replaced or supplemented by virtual-reality headgear (discussed below). Thus, these commands, in their present form, may also become obsolete.

Various non-limiting embodiments are directed to the use of various gestures in an environment in which the various gestures can be applied at substantially the same time as typing, and thereby can improve the working conditions of people who type. Typing is an activity that consumes many hours of people's time, but the present typing paradigm is inefficient and stressful. When one takes the time density of awkward, irritating, and error-prone micro-motions that the computer requires of a typist and multiplies it by the amount of time spent typing, the result is a relatively large waste of time and energy, the cause of irritation, and probably the cause of much stress-related ailments owing to various stresses placed on the user. The QWERTY keyboard seems here to stay, despite decades of calls for reform; however, little attention has been given to the cursor controls and other commands, which are arguably worse than the QWERTY keyboard.

For example, a QWERTY keyboard may include 26 letter keys and 10 digit keys, plus 48 other keys: the ratio of other keys to essential number/letter keys is 4:3. Of these 48 keys, some are typographic symbol keys (e.g., the key for colon and semicolon); subtracting these typographic keys reduces the number of "other" keys to 37, still outnumbering the number/letter/symbol keys.

A naive person would be unable to decipher most of the keys. Many are cryptic (e.g., "F6") and unusable without experience or a lookup table. Other keys patently announce their function (e.g., "caps lock" or "▶"). The ratio of cryptic to patent keys is roughly 2:1. There is little logic to the arrangement and relations of the roughly 27 cryptic mystery keys.

Many keys have functions that are non-essential and many people are not aware of what some keys do, and these arguably should not be bloating the keyboard. Other keys are never used, although the typist may have a vague notion of the functions of these keys. Thus, some keys should be eliminated and replaced by menu choices.

Entering commands via the keys requires precise action from the user, and lack of precision frequently invokes unwanted action when a finger misses the intended key and hits an adjacent key. The close-set "tab," "caps lock," shift," and "ctrl" are especially prone to frustrating mix-ups. Unwanted macros, windows, or modes can also spring up from missing a key. These errors then require additional precise actions to get back to where the user had been before the accident. As devices shrink, there is corresponding pressure to shrink the keys, and excruciatingly small keyboards can exacerbate a user's frustration.

Mouse/click commands (now commonly carried out on a "mouse pad") can also be an integral part of a computer system. However, these are often worse than the keys themselves. Precise movements are required by the small dimensions of a mouse pad, which causes users to waste their energy; also, the mouse pad is not able to carry out any action by itself, but requires an auxiliary left click or right click.

Using the display as a touch screen, in place of the mouse pad, helps the precision problem. However, as mentioned above, this requires moving the hands away from the keypad to the touch screen, introducing a new awkwardness as a result of moving one's hand(s) back and forth.

In consideration of the above-described issues with conventional input devices and their limitations, one or more embodiments described herein provide a system that does not need a physical display and that is compact. In an example embodiment, a virtual-reality device can superimpose text and a keyboard image onto the real world from the user's perspective.

In one embodiment, a method is described herein that includes receiving sensory information associated with an object in proximity to, or in contact with, an input device including receiving at least one level of interaction differentiation detected from at least two levels of interaction differentiation, interpreting a command from the sensory information as a function of the at least one level of interaction differentiation, and outputting an action indication based on the command.

According to an example, the at least two levels of interaction differentiation includes a proximity level and an electrical continuity level. In this example, receiving the sensory information further includes at least one of: interpreting the proximity level as a function of capacitance or sensing the electrical continuity level based on a grounding of a surface of at least one component of the input device by the object. Further to this example, the method includes increasing a number of command gestures based on interpreting the proximity level and sensing the electrical continuity level.

Further to the above example, interpreting the proximity level includes ascertaining a height of the object above the input device based on an output from at least one resonant circuit and locating a lateral position of the object with respect to the input device. Further, ascertaining the height includes comparing a first resonant frequency of a first component of the input device to a second resonant frequency of a second component of the input device to determine a lowest resonant frequency of the first resonant frequency and the second resonant frequency and measuring a distance between the object and the input device based on the lowest resonant frequency including determining that the object is closer to the first component or the second component based on the lowest resonant frequency. In another example, ascertaining the height includes comparing responses of components of the input device and applying a trigonometric function to the responses to ascertain the height of the object indirectly.

In another example, locating the lateral position includes calculating a first resonant frequency of a first component of the input device and a second resonant frequency of a second component of the input device and determining the lateral position as a function of a local minima between the first resonant frequency and the second resonant frequency. In another example, locating the lateral position includes detecting a difference between a first resonant frequency of a first component and a second resonant frequency of a second component adjacent to the first component and determining that the object is closer to the first component or the second component as a function of the difference.

According to a further example, outputting the action indication includes highlighting an item on a virtual display that includes a first portion and a second portion, in which the first portion includes the command associated with the action indication and the second portion includes a virtual representation of the input device. Further to this example, highlighting the item is performed in response to the object being in physical contact with the input device.

In accordance with another example, receiving sensory information includes detecting two or more objects in proximity to, or in contact with, the input device at a same time and identifying the two or more objects as a single object for purposes of a gesture command, in which receiving the sensory information includes receiving the sensory information associated with the single object. In another example, outputting the action indication includes transmitting, to a display device, a signal including the action indication and an interpretation of the command for output by the display device. In some examples, interpreting the command includes interpolating motion of the object. Further, in some examples, interpolating includes receiving data from a plurality of components of the input device and based on the data, constructing a smooth line to locate the object.

In another embodiment, a system, described herein, includes an environmental capture component configured to receive at least one gesture within a space relative to a keyboard, an interpretation component configured to identify a command based on the at least one gesture, and an output component configured to render information of the at least one gesture and a result of the command, in which the information is configured to be rendered on a virtual display. According to an example, the interpretation component is further configured to ascertain a proximity or an electrical continuity associated with the at least one gesture. Further to this example, the interpretation component is configured to ascertain the proximity by detecting cursor control and is configured to ascertain that a mechanical actuation indicates manual commands, and in which the electrical continuity facilitates a highlighting of a key in the virtual display. In some examples, the environmental capture component is configured to detect a movement in the space relative to and near the keyboard and detect pressure applied to the keyboard. Further to this example, the output component is configured to highlight at least a portion of the virtual display in response to detection of the pressure applied to the keyboard.

In another example, the system also includes a sensor configured to measure a capacitance as input to a determination of a height and a lateral location of a fingertip above the keyboard. In this example, the fingertip and a key of the key board form a capacitor of an resonant circuit, and in which the capacitance between the fingertip and the key is, by physics, proportional to $1/d$, where d is a separation in units of one-half a size of the fingertip and the key, and in which a frequency of the resonant circuit is a measure of distance. Further to this example, the system includes an evaluation component configured to measure a beat frequency that represents an extent to which the fingertip is closer to a first key than to a second key in a key pair. The beat frequency of the first key and the second key disappears in response to the fingertip being between the first key and the second key.

According to further examples, the virtual display includes augmented reality spectacles. In another example, the keyboard includes two portions having respective thumb-actuated space bars, and the two portions are configured to be folded together to cover keys associated with the two portions.

In an additional embodiment, a computer-readable storage medium is described having stored thereon computer-executable instructions that, in response to execution, cause a computing device to perform operations, including detecting a gesture that indicates at least one command to be performed, interpreting the gesture as the at least one command selected from a plurality of commands, and initiating a result of the at least one command as a perceivable event within a virtual space. According to one or more examples, detecting the gesture can include distinguishing the gesture that indicates the at least one command from a set of common proximity-level gestures, in which the set of common proximity-level gestures are ignored. In another example, detecting the gesture can include receiving an actuation that indicates an electrical contact between an external actor and a conductive actuation key on a keyboard. In yet another example, detecting the gesture can include comparing a first resonant frequency of a first conductive actuation key of an input device with a second resonant frequency of a second conductive actuation key of the input device to determine a lowest resonant frequency of the first resonant frequency and the second resonant frequency and measuring a distance between an external actor and the input device based on the lowest resonant frequency including determining that the external actor is closer to the first conductive actuation key or the second conductive actuation key based on the lowest resonant frequency. In a further example, detecting the gesture can include calculating a first resonant frequency of a first conductive actuation key of an input device and a second resonant frequency of a second conductive actuation key of the input device and determining a lateral position of an external actor as a function of a local minima between the first resonant frequency and the second resonant frequency.

According to some examples, interpreting the gesture includes ascertaining the gesture is at least one of a sweep gesture, a push-pull gesture, a circle gesture, a deflection gesture, an expansion-contraction gesture, or a rotating gesture. According to another example, initiating the result includes highlighting an item on a virtual display that includes a first portion and a second portion, illustrating a command associated with the gesture by the first portion, and presenting a representation of an input device by the second portion. In another example, highlighting the item is in response to physical contact between an external actor and the input device.

In yet another embodiment, a system, described herein, includes means for receiving an input in a form of a gesture, means for translating the gesture into a command selected from a set of alternative commands as a function of one or more of a proximity level, an electrical continuity level, and an actuation level. The system also includes means for outputting a result of the command, in a perceivable format, to a remote display device.

In an example, the system can also include means for interpreting the proximity level as a function of capacitance, means for sensing the electrical continuity level based on a grounding of a surface of a component of an input device by an object, and means for detecting the actuation level from movement of the component by an external force.

Still another embodiment described herein is a computing device that includes a keyboard that includes an array of keys, in which at least a subset of keys of the array of keys include a respective displacement actuated switch configured to detect pressure applied to a respective key of at least the subset of keys, and at least one capacitive sensor configured to detect a finger near the keyboard. The computing device also includes a translation module configured to translate a gesture near the keyboard into a command and a processor configured to change a display as a function of the command. In an example, the keyboard is configured to detect an electrical contact between the finger and at least the subset of keys to receive interaction information from a capacitive interaction, a conductive interaction, or a mechanical interaction. In some examples, the display is a remote virtual display and the processor is further configured to generate signals and transmit the signals to the remote virtual display. In other examples, the translation module is further configured to access a data store that includes a set of command gestures corresponding to different commands. In another example, the data store includes a set of common proximity-level gestures that are distinguishable from the set of command gestures.

Herein, an overview of some of the embodiments for providing a gesture keyboard has been presented above. As a roadmap for what follows next, various example, non-limiting embodiments and features for a gesture-based user interface for augmented reality are described in more detail. Then, a non-limiting implementation is given for a computing environment in which such embodiments and/or features can be implemented.

Gesture Based User Interface for Augmented Reality

As mentioned above, in various embodiments, a gesture keyboard is disclosed which is configured to recognize commands, input in the form of gestures, and implement one or more actions based on the commands. In some aspects, one or more of the commands can be input in the form of typing. According to some aspects, the commands can be input as a combination of gestures and typing. As utilized herein "typing" refers to traditional typing actions (e.g., contact with a key on a keyboard) and "gesture" refers to motions above or near the keyboard (e.g., actions other than typing). In an example, the one or more commands can be implemented in an augmented reality. FIG. 1 shows a flow diagram illustrating an example, non-limiting embodiment of a method for recognizing and implementing commands. The flow diagram in FIG. 1 could be implemented using, for example, any of the systems, such as the system 400 (of FIG. 4), described herein. An example utilized throughout this description is of a keyboard and/or spectacles. The keyboard can include capacitive keyboards. The spectacles can include head-mounted gear. However, it is to be appreciated that the embodiments described herein are not limited to the specific example of a keyboard and/or spectacles and that the embodiments described herein are comprehended to function with other input devices and/or output devices.

At 100, sensory information is received. The sensory information is associated with an object in proximity to, or in contact with, an input device. In a specific example, the input device can be a keyboard and the object can be a fingertip or another item used by an external actor (e.g., a person) to interact with the keyboard. For example, the person can interact with the keyboard to enter commands in the form of hand gestures or by typing. Such commands can be received as the sensory information.

The receiving, at 100, can include receiving at least one level of interaction differentiation detected from at least two levels of interaction differentiation. In some aspects, the interaction differentiation can distinguish between commands entered by typing and commands entered as gestures.

In an example, the at least two levels of interaction differentiation include a proximity level and an electrical continuity level. In a specific non-limiting example in the case of a keyboard, the proximity level can be sensed by capacitance and the electrical continuity level can be sensed by grounding of the surface of a key by the user's finger. In some examples, another level of interaction differentiation includes an actuation level. The actuation level can be sensed by actuation of the key by force or depression.

At 102, a command is interpreted from the sensory information as a function of the at least one level of interaction differentiation (e.g., one of a proximity level, an electrical continuity level, or, in some aspects, an actuation level) that was detected. For example, the interpreted command can be selected from a plurality of commands. The interpreted command, received in the form of a gesture, for example, can also be distinguished from a set of common proximity-level gestures, which are not intended to function as a command. If it is determined that the gesture is a common proximity-level gesture, the gesture is ignored (e.g., not implemented as a command). Further information related to various types of gestures is provided below.

At 104, an action indication is output based on the command. For example, the output indication can include highlighting a key in a virtual display that represents a virtual keyboard. Other examples include cursor movements, page movements, highlighting for cutting, copying, and pasting, and other actions to be implemented within a document that can be represented in the virtual display. In another example, the output indication can be presented as a perceivable event within a virtual space. In a further example an output indication, as the actuation level, can include adding a symbol to a text file. According to another aspect, the virtual display can be implemented with the use of augmented reality spectacles.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 2:
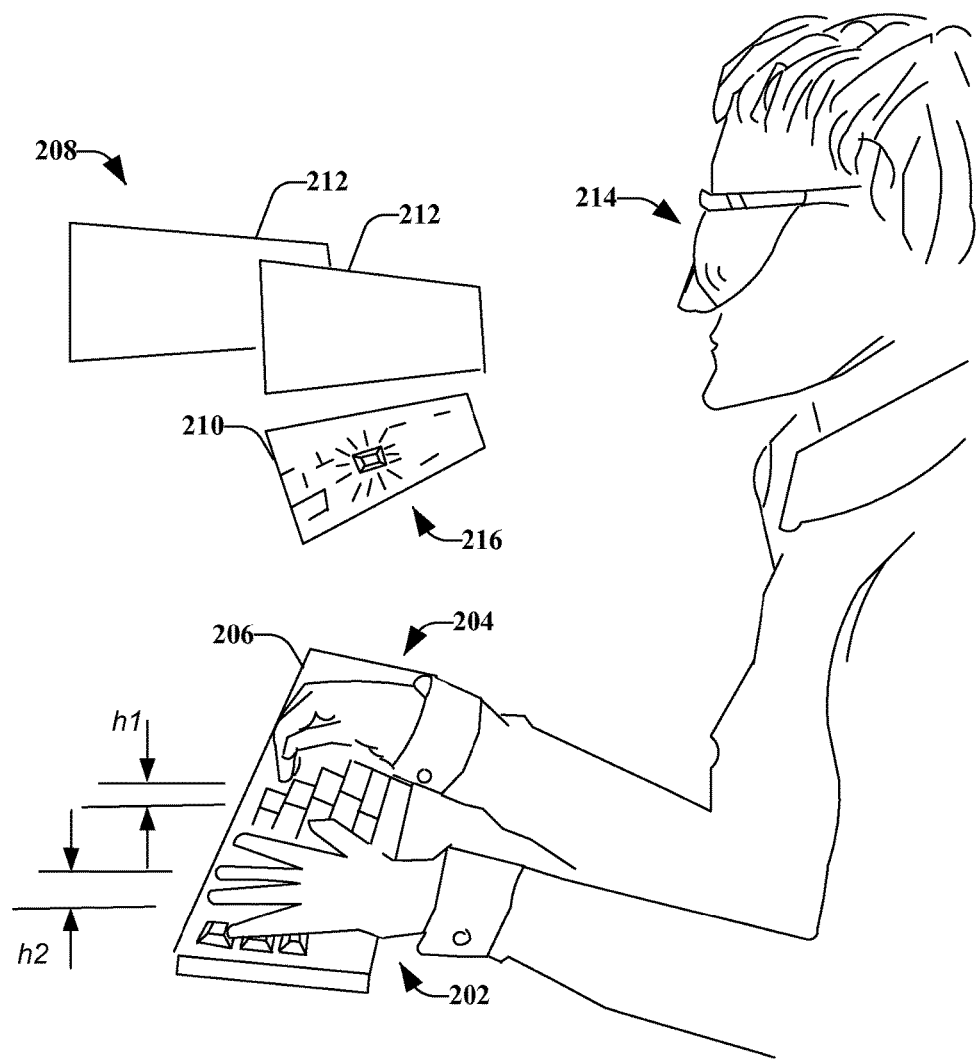
FIG. 2 illustrates a specific non-limiting example of a person using a gesture keyboard, according to an aspect.

Turning to FIG. 2, illustrated is a specific non-limiting example of a person using a gesture keyboard, according to an aspect. Depicted are a left hand 202 and a right hand 204 positioned over a keyboard 206. A finger of the right hand 204 is located a distance h1 above the right side of the keyboard 206. The outspread left hand 202 is a distance h2 above the left side of the keyboard 206. In an example, both a height and a lateral location of a fingertip above the keyboard can be detected. Additional information related to detection of the height and lateral location will be provided in more detail below.

In some aspects, the user may be grounded in some circumstances, and the keyboard might include a raised rim or a lightly-biased grounding bar, against which the wrists can rest, to assure that the user and the user's hands are at ground potential. A grounding wrist strap may be provided as an option.

When typing, the hands 202, 204 are poised over the keyboard 206 in a position similar to the position that is used to input the one or more gestures. In an aspect, the one or more gestures can be capacitive gestures. For example, in known capacitive keyboards, keys are actuated by "hand capacitance" due to proximity of a finger. According to the disclosed aspects, keyboard keys are connected to circuits that are used to detect the proximity of a fingertip. The detection of the fingertip proximity to the keyboard is utilized to detect finger motions in space relative to the keyboard, and, thus, hand gestures can be detected. The hand gestures function as commands, and can also function as typing commands, according to some aspects.

The disclosed aspects can utilize the capacitive hand gestures to replace key-actuated and mouse-pad commands, such as the commands used for moving the screen, cursor movements, return function, control function, clicking, and so forth. In conventional systems, such commands are implemented with precision motions and often caused errors. However, as disclosed herein, the commands can be input with less precise motion, resulting in fewer errors.

In an example, a sensor is configured to measure a capacitance as input to a determination of a height and a lateral location of a fingertip above the keyboard 206. For example, hand capacitance can be utilized by the sensor to determine the height and lateral location. The phrase "hand capacitance" originally referred to the change in the capacitance of a radio antenna when a person's hand was brought near the radio antenna. A variable capacitor is used for radio tuning, and the antenna can be de-tuned by the presence of a hand or other body part near the antenna, especially when the affecting person is grounded.

Hand capacitance was used intentionally as the basis of the theremin, the first musical instrument played without direct contact. The theremin produces sounds of arbitrary pitch, which can sweep rapidly in frequency as the player's hand moves. The theremin employs an antenna, which is coupled to an audio-frequency oscillator including a resonant LC (inductor-capacitor) circuit. As the antenna's capacitance is varied by the player's hand moving closer to, or farther from, the antenna, the frequency of the LC oscillations vary. The oscillations are amplified electronically and then sent to a loudspeaker, producing a sound of pitch that depends on the position of the person's hand.

Any conductive or partly-conductive object has capacitance, and its capacitance is affected by another object brought close (as the capacitance of the other object is also affected). A person's fingertip, for example, has a certain capacitance; another small conductive object, which might be a key on a keyboard, also has capacitance, and the two have a mutual capacitance. Their mutual capacitance is determined by geometry.

In a parallel-plate capacitor, the capacitance is large because the plates are close. If a first plate is grounded, and a voltage is impressed on a second plate by a battery, a charge appears on the second plate (but not the first plate, because the first plate is grounded). The capacitance of an object is defined as the amount of electrical charge that will accumulate on that object when it is raised to a potential of one volt.

If the plates are moved apart, charge will flow out of the second plate, back to the battery; if it is disconnected from the battery, the charge will stay constant but the voltage will rise as the plates separate. Eventually, the charged plate will be so far from the grounded plate that the effect of the grounded plate merges into the effect of the background (all surrounding grounded objects), and further separation makes no difference. The capacitance of an isolated object is therefore determined relative to the universe (which has ground potential), rather than any one particular other object.

A fingertip can be approximately modeled as a sphere, for the purpose of investigating its capacitance. The formula for the capacitance of an isolated sphere is $C=4\pi\epsilon_0 a$, where a is the radius of the sphere. A fingertip held in the air, if approximated by a sphere of radius 0.6 cm, has a capacitance of $4\pi\times(8.85\times10^{-12}$ F/m$)\times0.006$ m$=6.67\times10^{-13}$ F, or two-thirds of a picofarad.

However, when a sphere (or a finger) is brought close to something, its capacitance increases. The capacitance between two spheres of radius a, separated by a center-center distance d, is:

$$C=4\pi\epsilon_0(a^2/d)\{1+[a^2/(d^2-2a^2)]+\ldots \text{[higher-order terms]}\ldots\}.$$

As $d\to 2a$ (i.e., as the two spheres get close to touching), the quantity $(d^2-2a^2)$ approaches zero and the quantity $[a^2/(d^2-2a^2)]$ becomes very large, and therefore so does the capacitance. (The quantity $(a^2/d)$ approaches 0.5, so it is less important than $[a^2/(d^2-2a^2)]$.) Ignoring the higher-order terms and assuming a unit radius for the sphere ($d\geq 2$), the relative capacitance is:

$$(1/d)\{1+[1/(d^2-2)]+\ldots\}$$

or, roughly, as 1/d. Because a fingertip and a key on a keyboard can both be approximated as spheres of the same size, the capacitance between a fingertip and a key can be taken to be roughly proportional to 1/d, where d is the separation in units of one-half their size (a fingertip and a keyboard key are the same size).

If the key and the fingertip are used to form the capacitor of an LC resonant circuit, the resonant frequency will vary roughly as the square root of d, because the frequency is proportional to the inverse square root of the product of L and C. Because d is in units comparable to the size of either the finger or the key, the frequency of the key-fingertip circuit will be a sensitive measure of the distance, especially when the fingertip is near to the key.

If each key has its own resonant circuit formed with the key as part of a capacitor and a fixed inductance, then the key that has the lowest resonant frequency is the key closest to the fingertip, and that frequency is a measure of the distance from the fingertip to the nearest key (e.g., the height).

Aside from measuring finger-to-key distance by measuring their mutual capacitance as determined by the resonant frequency of the circuit associated with the key, the height of a finger can also be indirectly detected by comparing responses of keys, by trigonometry. The ratio of the distance from a hovering fingertip to a key directly beneath, to the distance of that fingertip to the adjacent key, increases as the fingertip moves toward the key beneath the fingertip. When the distance to the key immediately underneath is d, the distance to a key next to it is 1.41 d, because the two keys form a 45-45-90 right triangle. At a greater height, a 30-60-90 right triangle is formed and the distance ratio is 1.15 instead of 1.41. The closer to the keyboard surface the finger is, the greater the proportional difference in distance between adjoining keys, relative to the finger, and the greater the difference in frequency of adjacent LC circuits. The distance to the nearest finger can also be calculated in a similar manner, by ratios.

In some aspects, a sensor can be configured to detect the location by finding the key that, in a local area, has the lowest frequency in its LC circuit. If the fingertip causes two keys to have the same resonant frequency, then the finger is in between the two keys.

It should be noted that, because the resonant frequency varies as the square root of the distance, the ratio of change in frequency to change in distance is greatest at shortest distances, and is much less at larger distances; that is, the device is more sensitive at closer distances. This physical fact increases the utility of the gesture-based system disclosed herein, because a gesture, such as holding the hand flat and parallel to the keyboard (discussed below), which can be performed at a greater height, is less likely to cause confusion in the gesture-detecting circuitry.

According to some aspects, a beat frequency, which represents an extent to which the fingertip is closer to a first key than to a second key in a key pair is provided. For example, the resonant frequency of each key can be utilized directly, finding local minima of frequency that indicates a finger above. In some aspects, the resonant frequency of each key can be utilized indirectly, by finding the beat frequency, which is the difference of the frequencies of two adjoining keys (modulation).

The beat frequency represents the extent to which the fingertip is closer to one key than the other key. When the beat frequency between two keys disappears, then the finger is halfway between those keys. Similarly, when the user's hand is far away, then the beat frequency will be essentially zero between any pair of keys, since each key will have almost the same frequency (due to the variation as the square root of d, discussed above). In general, a single fingertip near the keyboard will be encircled by rings or loops of approximately zero beat frequency, but the keys in each ring or loop will have a non-zero beat frequency with respect to keys that are farther from or closer to the point under the key.

In some aspects, second-order beat frequencies, which are beat frequencies between the first-order beat frequencies, can be found. The second-order beat frequencies can provide a computational advantage in some circumstances. Third and higher orders can also be found. There may be a limit to this process, however, because the number of results shrinks with each iteration as an outer layer of keys is removed.

As mentioned above, there are three levels of interaction, which are functionally differentiated from each other so as to provide the maximum differentiation of interactions possible. The first level is proximity, which is sensed by capacitance; the second is electrical continuity, which is sensed by grounding of the surface of a key by the user's finger; and the third is actuation of the key by force or depression, as in a standard keyboard. According to some aspects, for greater mechanical ruggedness and/or a lower profile, force can be sensed by keys with no moving parts or minimally-moving parts, such as piezoelectric devices, capacitive devices similar to a capacitor microphone, or other devices.

The capacitive sensing may be used for cursor control. The electrical continuity may be used for highlighting a key in the virtual display (e.g., when the "H" key is lightly touched, it can be highlighted in the virtual keyboard display). The mechanical key actuation may be used for typing a symbol or for commands such as "enter" and "shift" that are ingrained in users and perhaps should not be changed for that reason.

The differentiation of capacitive gestures from continuity gestures can double the number of command gestures, in the same way that a key such as "ctrl" effectively doubles the number of functions for a selected set of keys. For example, moving the hand over the keyboard to the right (a "sweep") might be a command to move the cursor to the right, while lightly brushing the keys might be a slightly different command. However, two gestures that are difficult to perform without overlap, such as the two just mentioned, should not have very different meanings, and should not cause frustration, which is today caused by pressing adjacent instead of intended keys. As will be discussed in further detail below, one way to mitigate confusion between capacitive sweeps and conductive sweeps is to only register conductive sweeps that extend over a certain minimum distance or last for a certain minimum time. Further information related to gestures and associated commands will be provided below.

The sensing of hand capacitance can be coupled with a virtual display 208, shown as including a virtual keyboard 210 and two documents 212 (e.g., text documents or other types of documents). The virtual display 208 can be provided by augmented-reality spectacles 214. The use of spectacles 214 can reduce the unit to pocket-size and can also provide a 3-D display with additional display and control aspects.

In an aspect, the spectacles 214 can be configured to allow the user to see both the text, images, or other information that is being worked and also the virtual keyboard 210, the keys of which can be highlighted 216 in response to a light touch to the keyboard 206 by the user. Spectacles such as those discussed below can replace the current flat displays because the spectacles are smaller, lighter, less likely to be stolen (because they are more likely to be carried on the person), with smaller environmental impact, and can be less expensive. In addition, the spectacles are an augmented-reality device that can be used with many applications. Further, the wearing of spectacles can become common, such as it is common to wear ear-mounted telephones and music devices.

The spectacles 214 provide a virtual-reality device that superimposes text and a keyboard image onto the real world. This can permit typing notes during a meeting without having to divide attention between the person talking and the textual notes being taken. Further, the notes can remain confidential since the notes will not be on a screen, only on the spectacles.

The following will provide information related to spectacles that can be utilized with the disclosed aspects. However, the disclosed aspects are not limited to spectacles and are compatible with laptop computers and tablets. A split display, with a virtual keyboard on the lower half of the display and text on the upper half can be utilized. One type of spectacles that can be utilized with the various aspects are Cinemizer spectacles from Carl Zeiss, which allow private movie watching. The Cinemizer physically resembles wrap-around sunglasses. Using two high resolution liquid crystal display (LCD) screens and two focusable lens systems, the image is similar to that of a real screen with ½₀-inch pixels and a 45 diagonal (aspect ratio 3:4) placed 6 feet away. In a non-limiting test, the power lasted 4 hours, and the weight was 100 g.

In another example, spectacles utilized with the disclosed aspects can use partially-silvered, zero-diopter lenses that reflect light rays projected from the temple portions into the eyes of the user. The spectacles can employ low-power laser diodes (similar to the type used in laser pointers), which can be modulated at megahertz speeds simply by turning the power on and off. The modulated laser beams can be steered by a mirror or mirrors in a raster pattern, to produce images. Rather than scan the laser beams onto a surface, the modulated beams can be scanned directly into the eye (a "virtual retinal display"), using the partially-silvered inside surface of the eyeglasses lens as a converging mirror.

According to another example, for compactness, appearance, and optical reasons, a spectacle that can be utilized is a spectacle that has the lasers and beam-steering mirrors mounted in the eyeglass temples. The steering mirrors reflect the beams off the partially-metalized inside of the lens, as mentioned above, into the eye. For example, the eyeglass lens can include a fully-silvered surface on the outer portion, while the portion through which the user looks could be shaped as a paraboloid, ellipsoid of revolution, or other suitable shape, to act as a converging (focusing) element. The effect can be similar to the effect as that of a converging lens placed directly in front of the user's eye, with the scanning mirror located on the lens axis to shine the beam through the lens and thence into the user's eye; the lens can form the virtual image. The apparent size would depend on the focal length of the lens.

When a laser beam is sent directly into the eye in this manner there is no real image, so there is no concern about focusing, and there can be no mismatch between apparent focus distance and apparent distance by parallax (a discrepancy between these can cause fatigue). The focal length of the converging mirror determines the user's angular field of view, and therefore, a wide image is possible. Because the laser beam is thin, the resolution of the image is high, virtual objects are fine-grained, and projected images and text do not need to be large.

Full-color, stereo vision can utilize six lasers and a corresponding numbers of mirrors. These components are small, so the entire optical system could still be fitted into the side rails (temples) of a pair of thick-frame eyeglasses. For most purposes (including typing), monochrome, 2-D or 3-D images are also suitable. Two laser diodes and two beam-steering mirrors can provide a 3-D image that would allow different text files (or other images) to be pushed into the background and pulled forward, using a push/pull gesture. Ordinary red laser light, as from a laser pointer, can also be suitable with the various aspects discussed herein.

With the exception of the eyeglass lenses (which could also be corrective lenses), the remaining components of the spectacles are small. Therefore, the design of the spectacle frame is not constrained, and the spectacles can be made to conform to current styles. As utilized herein, the term "spectacles" is intended to cover any device developed in the future, such as contact lenses that form images, implants, and so forth. The term "spectacles" is also intended to include a monocle or other single-eye device.

As mentioned above, electrical continuity can be used for highlighting a key in the virtual display 208. The virtual display 208 might have two portions, an upper portion showing text (and/or figures, etc.) and a lower portion showing the keyboard (analogous to a laptop). For example, the upper portion showing text and the lower portion showing the keyboard can be similar to the two documents 212. A key that is grounded can be highlighted in the virtual display, and this can make typing much easier. The less-expert touch typist, who now glances away from the display to find a number key, or even the "z" key, will not need to avert her eyes because the touched key can be highlighted (as shown on the virtual keyboard 210). For example, the touched key can appear bright, flashing, in different color, or otherwise highlighted, and therefore the desired key can easily be found with a gliding finger. Once located, the key can be depressed to type the symbol without any chance (or minimized chance) for error.

Figure 3:
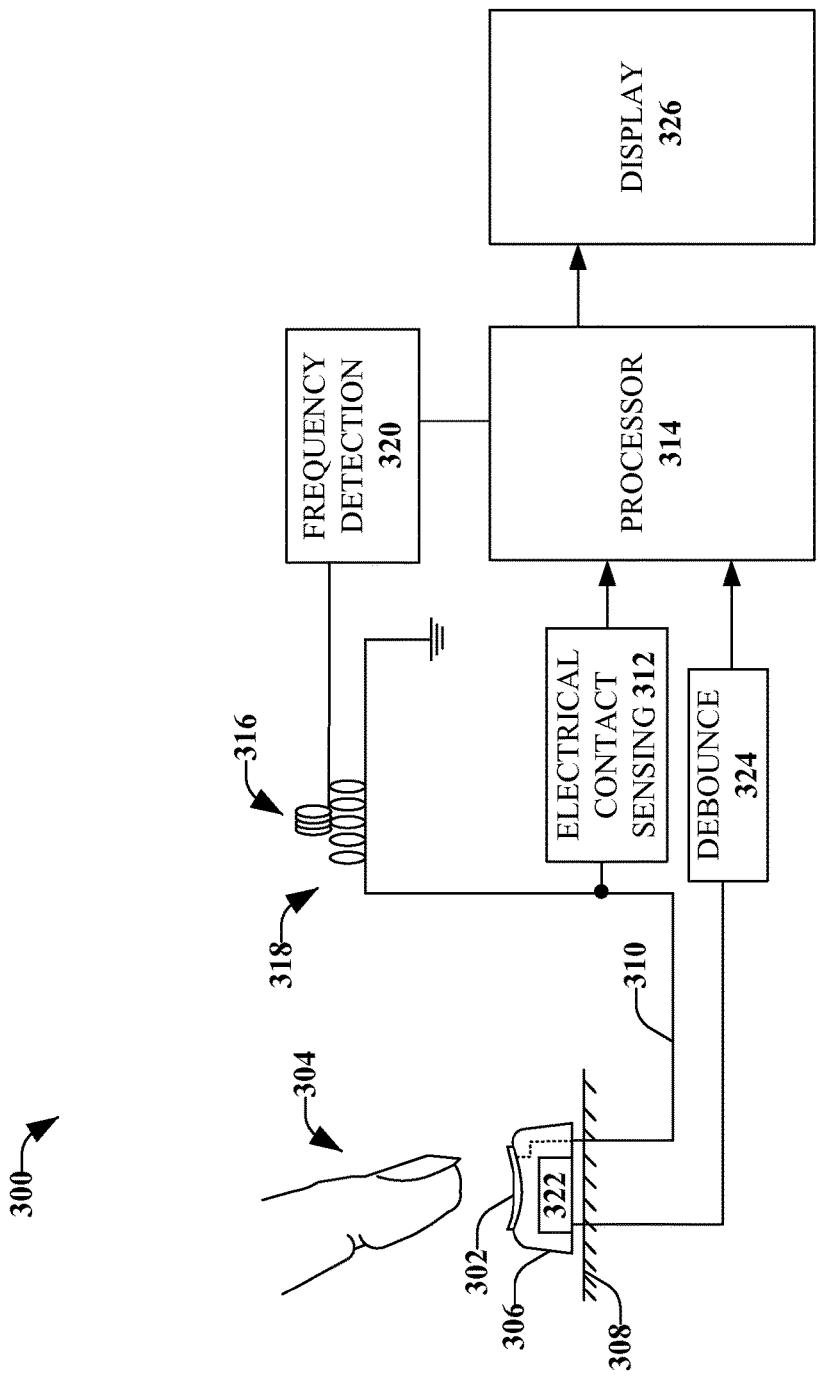
FIG. 3 illustrates non-limiting, example electrical circuitry that can be utilized to provide a gesture keyboard.

FIG. 3 illustrates non-limiting, example electrical circuitry 300 that can be utilized to provide a gesture keyboard. To achieve three-way interaction, a standard keyboard can be fitted with metal foils 302 or other conductive parts on the key surfaces. The foils 302 can function as both capacitor plates and grounding electrodes, and these electrodes can be coupled to circuits below. As a fingertip 304 approaches, the frequency of the circuit changes. When the key 306 on the keyboard 308 is touched and therefore grounded, oscillation stops. For example, a lead 310 from the foil 302 can provide an input to an electrical contact sensing module 312, which can interact with a processor 314. In an aspect, the electrical contact sensing module 312 is configured to detect the electrical continuity.

The foil 302 on key 306 acts as a capacitor plate in opposition to the grounded finger 304, and connects though the lead 310 with an inductor 318 and thereby forms a resonant tank circuit (other types of resonant circuits can also be used). The circuit also includes, for example, a magnetically-coupled pickup coil 316 that is coupled to a frequency detection module 320 to determine whether the finger 304 is near the key 306, far from the key 306, or even in contact with the key 306, by picking up signals from the resonance in the coil 316. Physical contact of the finger 304 with the foil 302 can also be sensed by a dedicated electrical contact sensing module 312. The pickup coil 316, another similar coil (not shown), or another type of connection to the tank circuit, can drive the oscillations of the tank circuit formed by the inductor 318 and capacitor 302/304 with, for example, positive feedback. In some aspects, the frequency detection module 320 is utilized as a sensor that detects the proximity.

In another example, a pressure switch 322 located under the key 306 can be detected by a debounce module 324, which can communicate with the processor 314. In an aspect, the pressure switch 322 and/or debounce module 324 facilitate sensing the mechanical actuation.

The processor 314 is configured to monitor the keys and can ascertain the position of the finger by the frequency, or, in an alternate aspect, the processor 314 can monitor the keys by a parallel circuit that detects only continuity. The processor 314 can cause an output (e.g., a result of a command, information, an action indication, and so forth) to be rendered on a display 326, which can be presented to the user in a perceivable format.

Example gestures that can be detected will now be discussed. Doubled fingers or multiple pursed fingers can be interpreted and treated by the circuitry in a similar manner as an isolated, or a single finger. However, a single finger or group can be differentiated from open-handed gestures with fingers separated by, for example, about two inches as illustrated by the left hand 202 in FIG. 2. The open-hand gesture shown in FIG. 2 can be differentiated on the basis of its decreased capacitance gradient, especially when farther from the keyboard (e.g., when h1 is less than h2 in FIG. 2). Gestures that require precision are to be minimized because these gestures will, similar to the fine motions required for hitting a particular key, be difficult to perform accurately.

Additionally, gestures specifically intended to replace the worst of the current mystery-key/point-click commands can be selected. These include cursor movements, page movements, and highlighting for cutting, copying, and pasting, which typically utilize not one but two fingers to simultaneously be located within a quarter-inch at respective target keys (e.g., "ctrl V" for pasting).

A type of gesture that can be exploited is the sweep, a lateral motion of the hand or fingers across the keyboard, for example, by moving the hand or one or more fingers parallel to the keyboard surface (which can be detected by capacitance sensing). A sweep can be performed repeatedly and quickly by circling the hand above the keyboard around a horizontal axis, and can easily be varied from brisk bold motions for large displacements to small or slower motions for fine displacements of a cursor, or of the display, which is an intuitive motion. If the circuitry tracks finger height rather than merely detecting fingers within a predetermined actuation distance from the keyboard, then sweep control can be finer and more intuitive if the motion parallel to the keyboard surface is multiplied by the inverse of the height, for example, by multiplying the speed by the lowest resonant frequency. This can cause a greater response when the finger is closer to the keyboard, which is an intuitive variation. A sweep can also be performed conductively, for example, by lightly brushing the fingers over the keyboard, making electrical contact but not actuating the keys for typing. This is discussed in further detail below.

Another example of a related gesture is the touch-screen contact sweep, which is used in some devices to input a command for lateral motion of the displayed image. The touch-screen contact sweep can be performed capacitively or conductively. Virtual momentum and friction can be used also. To mitigate confusion, a contact sweep can be ignored unless it is of a certain distance and/or duration, for example.

In another example, if the sweep is only horizontal, then its vertical counterpart can be called a roll. Depending on the software, the touch-screen contact sweep and roll can be distinct gestures or subsumed in a single lateral movement at an arbitrary angle, whereby display elements could be moved diagonally. A variation on the sweep is the dither, a back-and-forth motion that includes consecutive alternating opposite motions parallel to the keyboard.

Another example of a gesture is pushing or pulling. In this gesture, the hand is spread flat, fingers extended, forming a capacitor ground plate parallel to the keyboard, and moved toward or away from the keyboard. This gesture can be performed independently on the two sides of the keyboard, allowing two commands each with two senses. A stationary hover of the open hand can also constitute a command analogous to "ctrl" or "alt," for example, a mode changer that would modify the gesture being made by the other hand.

The push-pull gesture can be used to move virtual text (or other display) toward or away from the user. This might be useful for switching documents: one could be brought forward, whereupon another would recede out of eye convergence range (accomplished with the 3-D feature of the spectacles) and could also be made fainter so as not to distract. Open documents could also be moved laterally by horizontal sweeping and vertical rolling.

Another example type of gesture is circling, which can be performed either capacitively or conductively. Since there are two sides to the keyboard and two senses of rotation, circling can convey four different commands (more if the diameter of the circle is detected and made a factor in the gesture).

A further example of a gesture is holding the fingers in one area of the keyboard, where the distance and direction from the center have a similar effect as deflection of a joystick. (In polar coordinates, the distance and direction from the center would be r and θ.) This can be used to control the cursor, in the manner of certain laptops that have a nubbin, which moves the cursor in the direction the nubbin is deflected. This type of control can benefit from virtual physics. If the deflection were taken as an accelerating virtual force on a virtually-massive cursor (possibly with virtual friction), then the interface can be more natural. In addition, a reversal of the fingers might be interpreted differently from an advance of the fingers away from the center, the first leading to a different acceleration as a function of position. Since the height of a finger is already detected, this gesture could be generalized to include the height as a controlling factor. In cylindrical coordinates, r, θ, and z would all be input variables.

Another example of a gesture is expansion/contraction, which can be accomplished by moving two fingers or hands closer and farther to one another. This gesture can be used in touch-screen devices to command expansion or contraction of the displayed image. In the keyboard, this gesture could have a different meaning. A further example gesture is rotating with two fingers, which can be used to turn an image.

The non-limiting example gestures discussed herein include gestures than can be mined for use as typing commands, and therefore can allow for a new interface that utilizes fewer keys and less precision. It also offers programmers an opportunity to write new code that obeys, rather than frustrates, the user. The best correspondence between gestures and commands that change the display is a matter that can be decided by psychologists and/or user evaluation. For example, gestures that occur normally, such as moving both hands onto position over the keyboard simultaneously when commencing to type, should not be construed as commands and may be excluded (or ignored).

Aside from the immediate applications of typing, the gestures might also be used for menu navigation, perhaps after switching modes via a gesture or key. Alternatively, the disclosed aspects can be incorporated into a larger gesture-controlled virtual world that is extraneous to typing.

Figure 4:
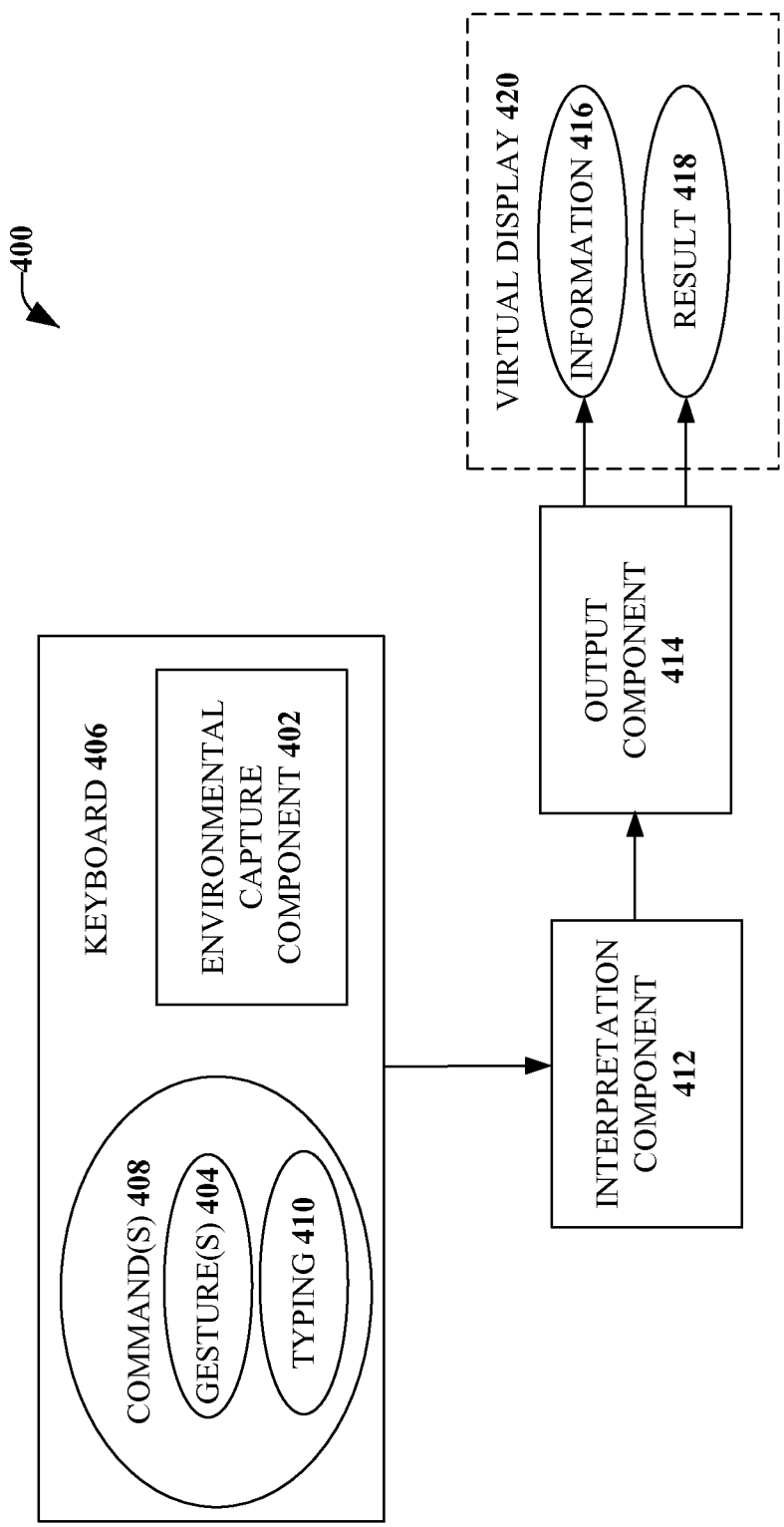
FIG. 4 illustrates a block diagram of an example, non-limiting embodiment of a system that is configured to recognize and implement commands.

With respect to one or more non-limiting ways to implement a gesture keyboard, FIG. 4 illustrates a block diagram of an example, non-limiting embodiment of a system that is configured to recognize and implement commands. As shown in FIG. 4, a gesture-based system 400 is depicted that includes an environmental capture component 402 configured to receive at least one gesture 404 within a space relative to a keyboard 406. In some aspects, the gesture 404 is intended to be a command 408, such as, for example, cursor control, scrolling of a document, and so forth. In some aspects, the command 408 is received in the form of typing 410.

The space relative to the keyboard 406 can be a location on (e.g., physical contact with) the keyboard 406 or a location above (e.g., no physical contact with) the keyboard 406. The environmental capture component 402 is configured to detect the presence of fingers of either or both hands, even though the fingers might not be in physical contact with the keyboard 406.

In an example, the keyboard 406 can be a standard keyboard retrofitted with metal foils or other conductive parts on the key surfaces, which will be discussed in further detail below. In another example, the keyboard 406 can be a two-part folding keyboard, in which the two halves are divided in the manner of "ergonomic" keyboards, but with a thumb-actuated space bar on each half. If connected by a stiff but yielding universal joint located in the middle of the upper edge, the keyboard halves can be aligned on a tabletop in the usual orientation, spread slightly into the ergonomic configuration, or draped over the lap. When not in use, the two halves can be folded together to cover the keys, resulting in a package measuring about 4.5 by 6 inches, the size of a paperback novel. One-piece keyboards can also be used, according to an aspect. A processor can be located in the keyboard (as in present laptops) or in a separate unit. In some aspects, the two sides of the keyboard can be used independently, and, thus, the mechanical design can also provide for some separation mechanism.

Also included in the gesture-based system 400 is an interpretation component 412 configured to identify the command 408 based on the at least one gesture 404 or the typing 410. The gesture-based system 400 also includes an output component 414 configured to render information 416 related to the command 408 and a result 418 of the command. The information 416 and/or the result 418 is configured to be rendered on a virtual display 420. In some aspects, the information 416 and/or the result 418 is configured to be rendered in a virtual space.

Figure 5:
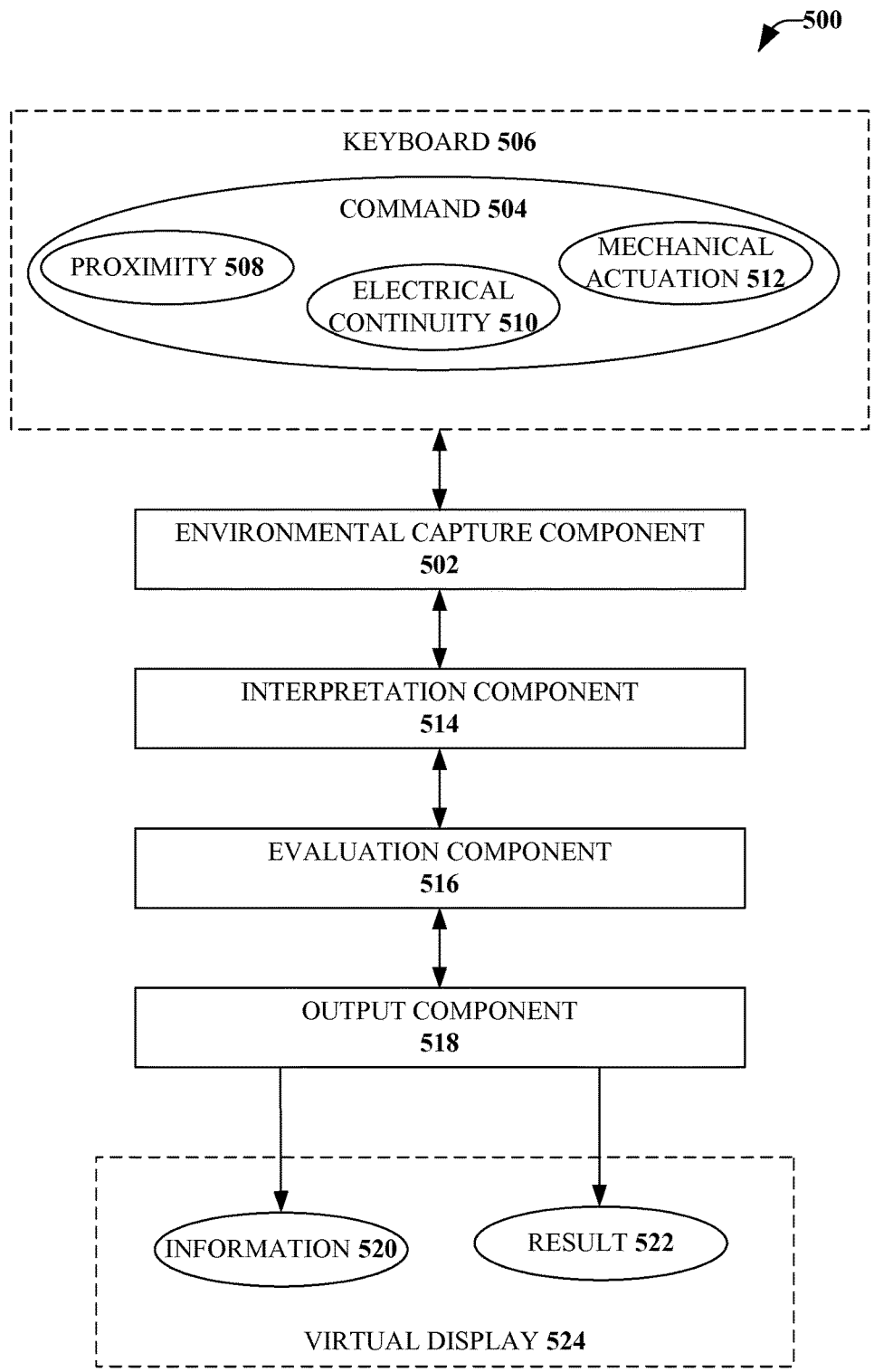
FIG. 5 illustrates a non-limiting, example system for interpreting and implementing commands received in the form of hand gestures or typing.

FIG. 5 illustrates a non-limiting, example system for interpreting and implementing commands received in the form of hand gestures or typing. As shown, FIG. 5 depicts a gesture-based system 500 that includes an environmental capture component 502 configured to receive at least one command 504 within a space relative to a keyboard 506. In an example, the keyboard 506 is similar to keyboard 406 in FIG. 4. In an example, the environmental capture component 502 is configured to detect a movement in the space relative to and near the keyboard 506 (e.g., gestures) and to detect pressure applied to the keyboard 506 (e.g., typing). For example, one or more sensors can be configured to detect a proximity 508, an electrical continuity 510, or a mechanical actuation 512. In some aspects, a sensor can be configured to detect a height and a lateral location of a fingertip above a keyboard by capacitance.

Also included in gesture-based system 500 is an interpretation component 514 configured to identify the command 504 based on at least one gesture and/or the typing. In an example, the interpretation component 514 is configured to identify at least one command as a function of the proximity 508 by capacitance, for example.

In another example, the interpretation component 514 is configured to identify the at least one command based on the mechanical actuation 512, which can indicate manual commands. Further, the interpretation component 514 can identify a command and can interpret that the electrical continuity 510 should produce highlighting of a key in a virtual display.

The gesture-based system 500 also includes an evaluation component 516 configured to measure a beat frequency that represents an extent to which the fingertip is closer to a first key than to a second key in a key pair. For example, the evaluation component 516 is configured to use the resonant frequency of each key directly, finding local minima of frequency that indicate a finger above. In another example, the evaluation component 516 is configured to use the resonant frequency of each key indirectly, by finding the beat frequency, which is the difference of the frequencies of two adjoining keys (modulation). In some aspects, evaluation component 516 is configured to find second-order beat frequencies or higher order beat frequencies.

According to some aspects, the keyboard 506 includes a circuit that detects when frequency of an oscillator goes below a fixed or predetermined frequency that correlates with a certain distance above the keyboard 506. This can create a virtual barrier, penetration of which by a fingertip can be an event that causes that key to register. There could be two or more such barriers, which can be utilized to differentiate gestures performed at different heights. There are many possible detection methodologies. The disclosed aspects include any program or circuitry that detects fingers or other objects near the keyboard 506, and tracks the fingers or objects in such a way that gestures near the keyboard 506 can be discriminated and determined.

Also included in the gesture-based system 500 is an output component 518 configured to render information 520 of the command 504 and a result 522 of the command. The information 520 and/or the result 522 is configured to be rendered on a virtual display 524. In some aspects, the information 520 and/or the result 522 is configured to be rendered in a virtual space. In an implementation, the output component 518 is configured to highlight at least a portion of the virtual display 524 in response to detection of pressure applied to the keyboard 506.

In contrast to existing capacitive keyboards, the keyboard 506 does not use capacitance to actuate a key; instead, the keyboard 506 uses mechanical key actuation, which provides beneficial tactile and auditory feedback to the user. The keyboard 506 thus allows the fingers to touch the keys without causing an actuation, and therefore permits the user to make hand gestures in the space above the keyboard 506 without worrying about lightly hitting the keyboard 506. This freedom from error can make performance of the gestures easier and less stressful.

Figure 6:
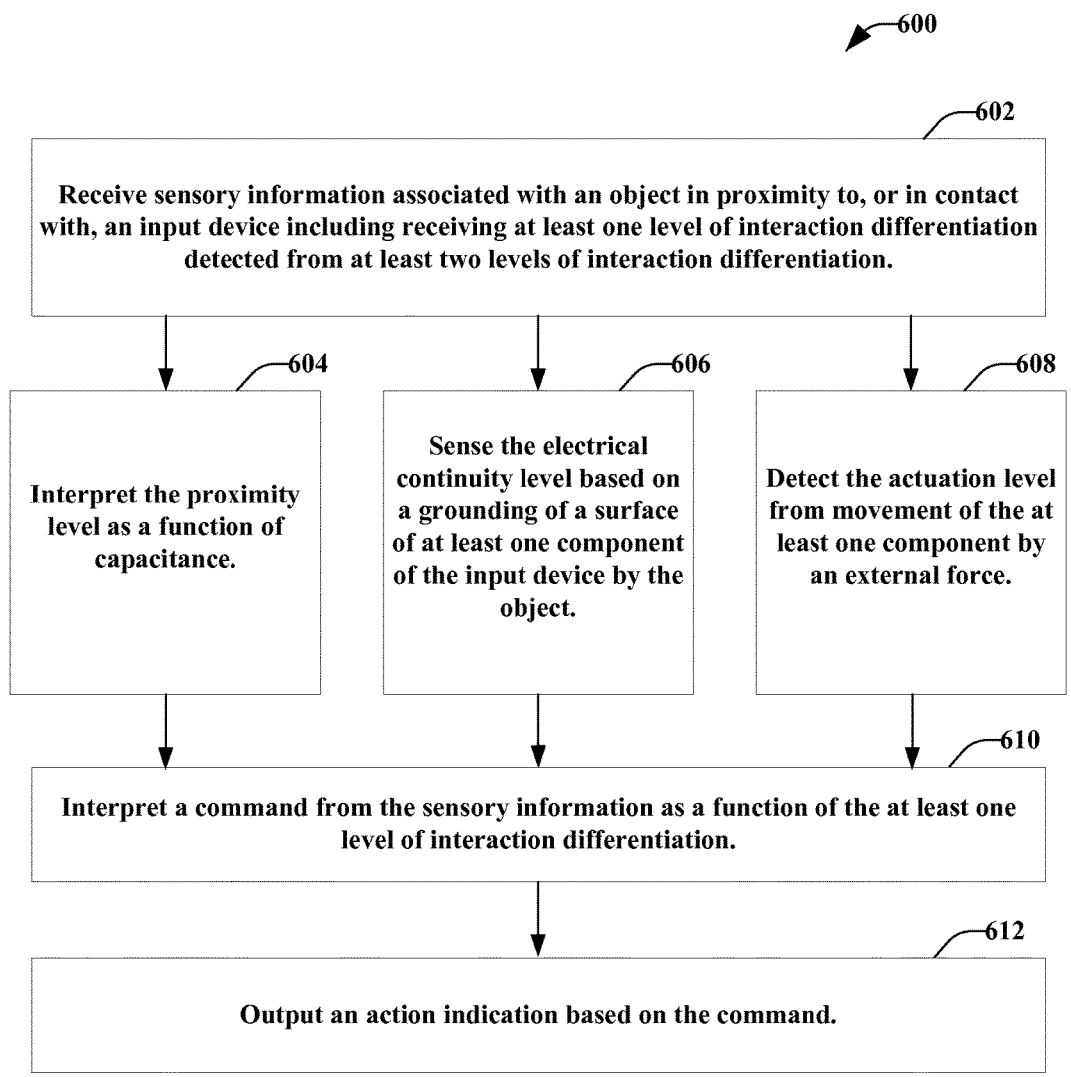
FIG. 6 is a flow diagram illustrating an example, non-limiting embodiment of a method for recognizing and implementing commands.

FIG. 6 is a flow diagram illustrating an example, non-limiting embodiment of a method 600 for recognizing and implementing commands. The method 600 in FIG. 6 could be implemented using, for example, any of the systems, such as the system 400, described herein and could be used to recognize and implement commands. At 602, method 600 can include receiving sensory information associated with an object in proximity to, or in contact with, an input device including receiving at least one level of interaction differentiation detected from at least two levels of interaction differentiation. For example, the at least two levels of interaction differentiation can include a proximity level and an electrical continuity level. In some aspects, a third level of interaction differentiation includes an actuation level.

At 604, the proximity level is interpreted as a function of capacitance. At 606, the electrical continuity level is sensed based on a grounding of a surface of at least one component of the input device by the object. In some aspects that utilize an actuation level, the actuation level is detected, at 608, from movement of the at least one component by an external force. It should be noted that at least one of interpreting, at 604, sensing, at 606, or detecting, at 608 can be implemented. For example, the electrical continuity level might be sensed, but the proximity level might not be interpreted and the actuation level might not be detected, according to an aspect.

At 610, a command is interpreted from the sensory information as a function of the at least one level of interaction differentiation. At 612, an action indication is output based on the command. The action indication can highlight a key on a virtual keyboard and/or perform an action within a virtual display. The virtual keyboard and/or virtual display can be realized through the use of spectacles or through the use of other devices that can provide the virtual reality.

Figure 7:
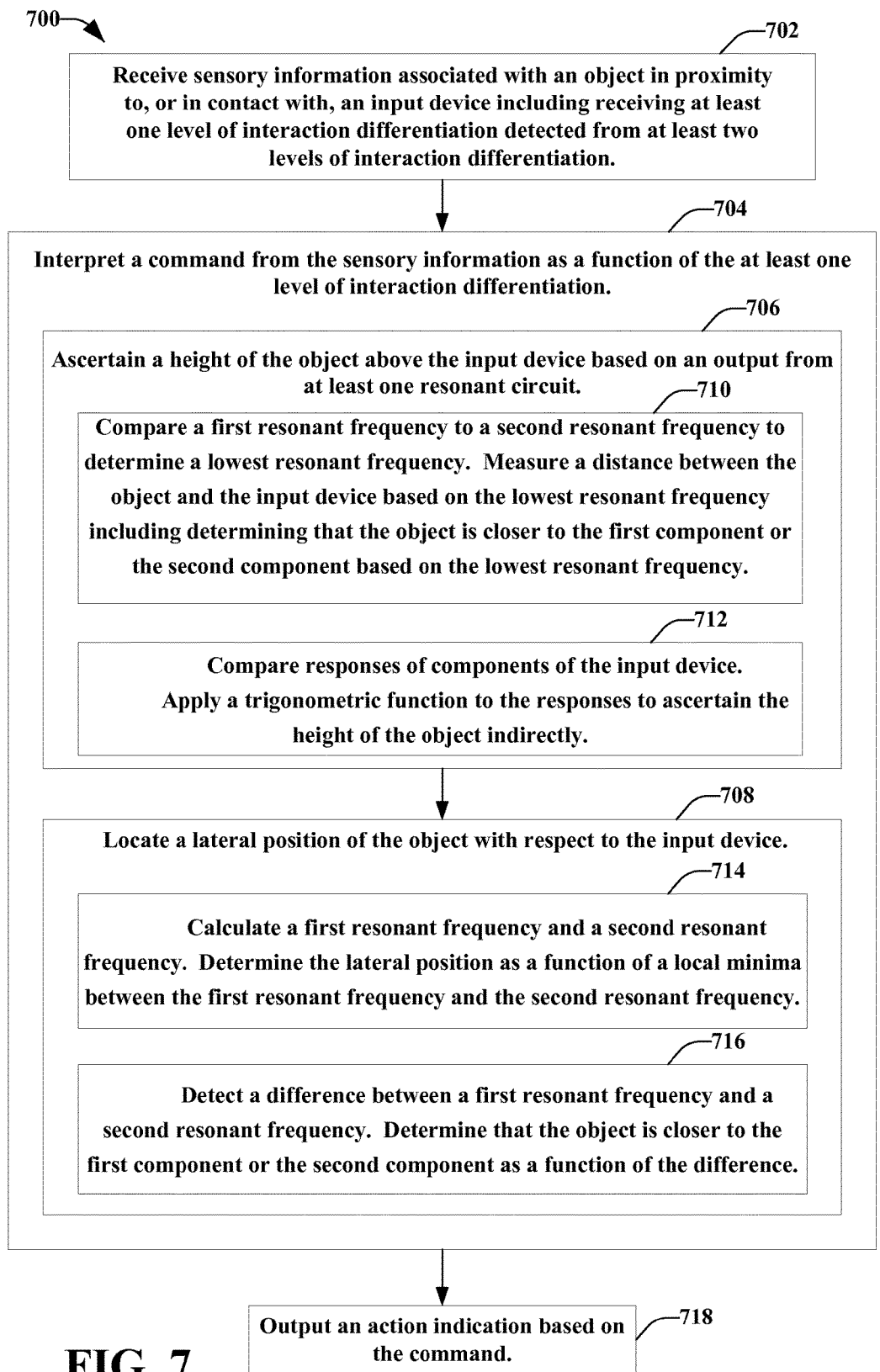
FIG. 7 is a flow diagram illustrating an example, non-limiting embodiment of a method for recognizing and implementing commands.

FIG. 7 is a flow diagram illustrating an example, non-limiting embodiment of a method 700 for recognizing and implementing commands. The method 700 in FIG. 7 could be implemented using, for example, any of the systems, such as the system 500, described herein and could be used to recognize and implement commands. At 702, method 700 can include receiving sensory information associated with an object in proximity to, or in contact with, an input device including receiving at least one level of interaction differentiation detected from at least two levels of interaction differentiation. For example, the at least two levels of interaction differentiation can include a proximity level and an electrical continuity level.

At 704, a command is interpreted from the sensory information as a function of the at least one level of interaction differentiation. Interpreting the command can include ascertaining a height of the object above the input device based on an output from at least one resonant circuit, at 706, and locating a lateral position of the object with respect to the input device, at 708.

In an implementation, ascertaining the height of the object, at 706, includes comparing a first resonant frequency of a first component of the input device to a second resonant frequency of a second component of the input device to determine a lowest resonant frequency of the first resonant frequency and the second resonant frequency. Further to this implementation, ascertaining the height of the object, at 706, includes measuring a distance between the object and the input device based on the lowest resonant frequency including determining that the object is closer to the first component or the second component based on the lowest resonant frequency, at 710.

In another implementation, ascertaining the height of the object, at 706, includes comparing responses of components of the input device and applying a trigonometric function to the responses to ascertain the height of the object indirectly, at 712.

In a further implementation, locating the lateral position, at 708, includes calculating a first resonant frequency of a first component of the input device and a second resonant frequency of a second component of the input device; and determining the lateral position as a function of a local minima between the first resonant frequency and the second resonant frequency, at 714.

In another implementation, locating the lateral position, at 708, includes detecting a difference between a first resonant frequency of a first component and a second resonant frequency of a second component adjacent to the first component, and determining that the object is closer to the first component or the second component as a function of the difference, at 716.

An action indication is output, at 718, based on the command. The action indication can be output to a virtual display and/or a virtual space that cannot be viewed by others and, therefore, remains confidential to the user.

Figure 8:
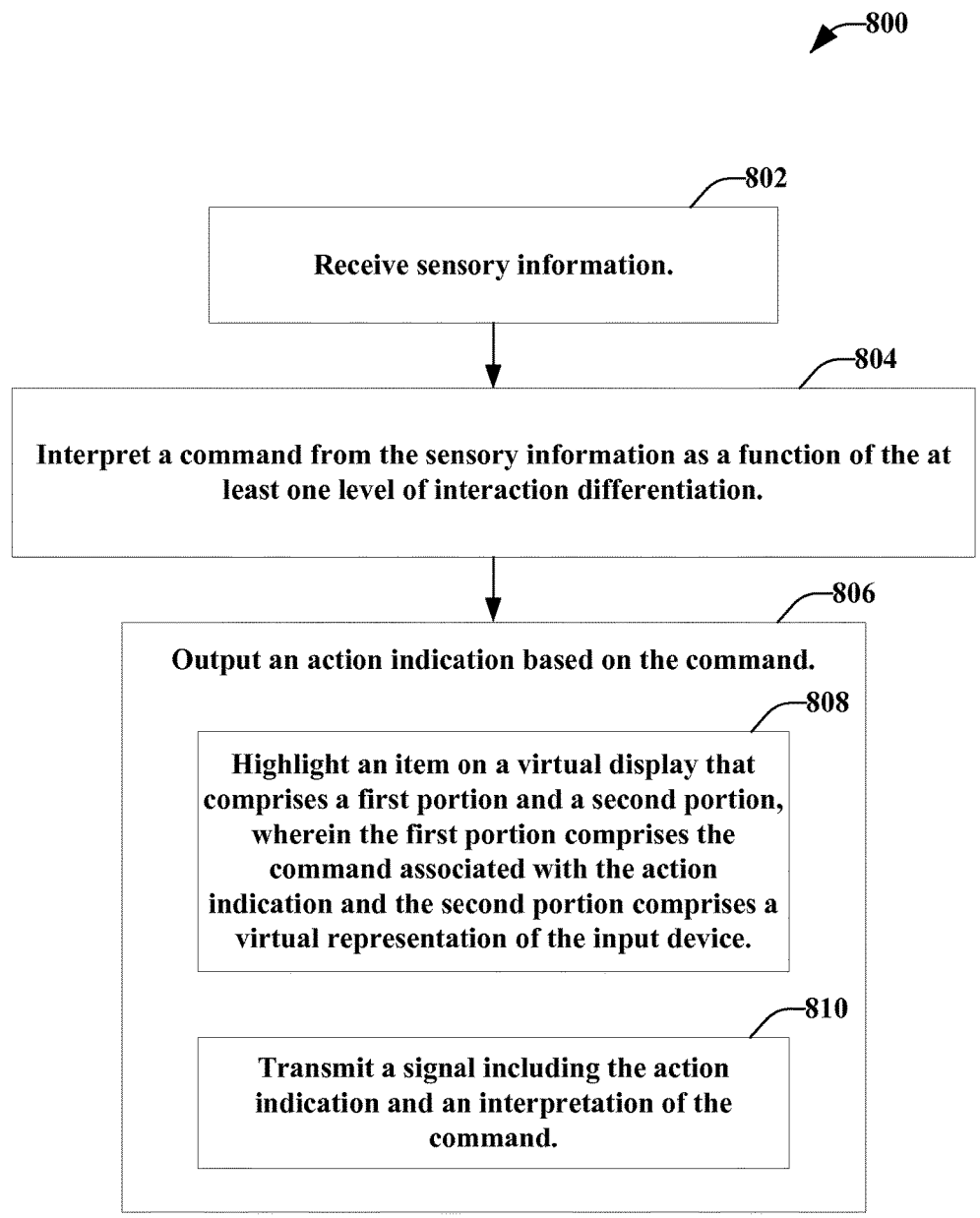
FIG. 8 is a flow diagram illustrating an example, non-limiting embodiment of a method for recognizing and implementing commands.

FIG. 8 is a flow diagram illustrating an example, non-limiting embodiment of a method 800 for recognizing and implementing commands. The method 800 in FIG. 8 could be implemented using, for example, any of the systems, such as the system 400, described herein. At 802, sensory information is received. The sensory information is associated with an object in proximity to, or in contact with, an input device. The receiving can include receiving at least one level of interaction differentiation detected from at least two levels of interaction differentiation. In an example, the at least two levels of interaction differentiation include a proximity level and an electrical continuity level. In some aspects, a third level of interaction differentiation includes an actuation level.

At 804, a command is interpreted from the sensory information as a function of the at least one level of interaction differentiation. The interpretation of the command can include detecting two or more fingers and interpreting the two or more fingers as a single, isolated finger for purposes of interpreting the sensory information.

At 806, an action indication is output based on the command. In an implementation, outputting the action indication includes, at 808, highlighting an item on a virtual display that includes a first portion and a second portion. The first portion includes the command associated with the action indication and the second portion includes a virtual representation of the input device. In an example, the highlighting the item is performed in response to the object being in physical contact with the input device. In an alternate implementation, outputting the action indication includes transmitting a signal including the action indication and an interpretation of the command, at 810. The signal can be transmitted to a display device that is configured to output the action indication and the interpretation of the command. The display device can be implemented through the use of spectacles or another device that can be configured to present a virtual display to the user.

Figure 9:
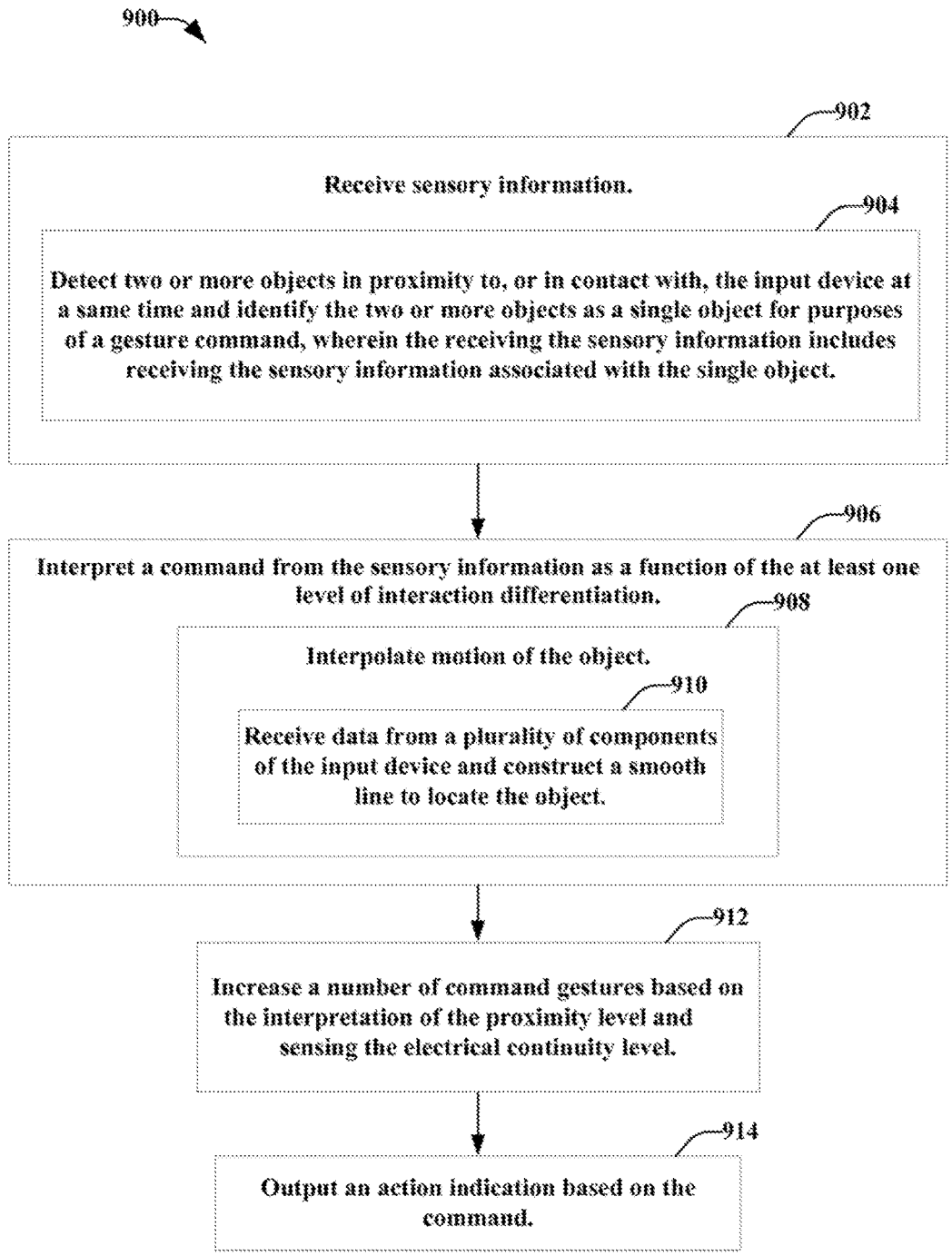
FIG. 9 is a flow diagram illustrating an example, non-limiting embodiment of a method for recognizing and implementing commands.

FIG. 9 is a flow diagram illustrating an example, non-limiting embodiment of a method 900 for recognizing and implementing commands. The method 900 in FIG. 9 could be implemented using, for example, any of the systems, such as the system 500, described herein and could be used to recognize and implement commands. At 902, sensory information is received. The sensory information is associated with an object in proximity to, or in contact with, an input device. In an implementation, the receiving, at 902, also includes, at 904, detecting two or more objects in proximity to, or in contact with, the input device at a same time, or at substantially the same time, and identifying the two or more objects as a single object for purposes of a command. The receiving the sensory information includes receiving the sensory information associated with the single object.

At 906, a command is interpreted from the sensory information as a function of the at least one level of interaction differentiation. In an implementation, the interpretation, at 906, includes interpolating motion of the object, at 908. In an example, interpolating motion of the object includes receiving data from a plurality of components of the input device and, based on the data, constructing a smooth line to locate the object, at 910.

For example, precise motions, especially rapid motions, can be interpolated from the key data. For example, data from a number of keys can be considered and from that data a smooth line can be constructed which is located more precisely than the spacing of the keys, using smoothing methods for graphs and/or relative distances between keys, as measured by comparison of resonant frequencies. The resonant frequencies of adjacent keys can provide an indication of relative distance of the fingertip from the two keys, and therefore can locate the fingertip to a precision greater than that of the key array spacing.

In some aspects, method 900 can include increasing a number of command gestures based on interpreting the proximity level and sensing the electrical continuity level, at 912. An action indication is output, at 914, based on the command.

Figure 10:
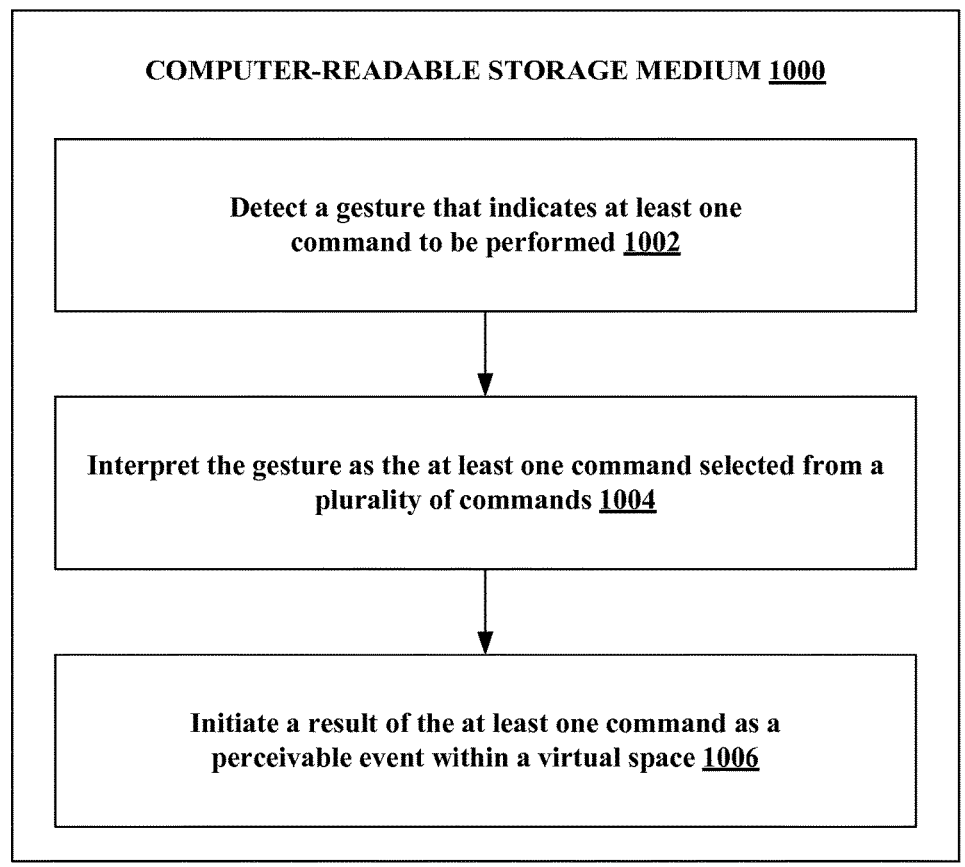
FIG. 10 illustrates a flow diagram of an example, non-limiting embodiment of a set of computer readable instructions for a gesture based keyboard in accordance with at least some aspects of the subject disclosure.

FIG. 10 illustrates a flow diagram of an example, non-limiting embodiment of a set of computer readable instructions for a gesture keyboard in accordance with at least some aspects of the subject disclosure. Computer-readable storage medium 1000 can include computer executable instructions. At 1002, these instructions can operate to detect a gesture or typing that indicates at least one command to be performed. In an example, to detect the gesture, the instructions can operate to distinguish the gesture that indicates the at least one command from a set of common proximity-level gestures, and the set of common proximity-level gestures are ignored.

In another example, to detect the gesture, the instructions can operate to receive an actuation that indicates an electrical contact between an external actor and a conductive actuation key on a keyboard.

In another example, to detect the gesture, the instructions can operate to compare a first resonant frequency of a first conductive actuation key of an input device with a second resonant frequency of a second conductive actuation key of the input device to determine a lowest resonant frequency of the first resonant frequency and the second resonant frequency. Further to this example, the instructions can operate to measure a distance between an external actor and the input device based on the lowest resonant frequency including determining that the external actor is closer to the first conductive actuation key or the second conductive actuation key based on the lowest resonant frequency.

According to a further example, to detect the gesture, the instructions can operate to calculate a first resonant frequency of a first conductive actuation key of an input device and a second resonant frequency of a second conductive actuation key of the input device. Further to this example, the instructions can operate to determine a lateral position of an external actor as a function of a local minima between the first resonant frequency and the second resonant frequency.

At 1004, the instructions can operate to interpret the gesture as the at least one command selected from a plurality of commands. In an example, to interpret the gesture, the instructions can operate to ascertain the gesture is at least one of a sweep gesture, a push-pull gesture, a circle gesture, a deflection gesture, an expansion-contraction gesture, or a rotating gesture.

At 1006, the instructions can operate to initiate a result of the at least one command as a perceivable event within a virtual space. In an example, to initiate the result, the instructions can operate to highlight an item on a virtual display that includes a first portion and a second portion, illustrating a command associated with the gesture by the first portion, and presenting a representation of an input device by the second portion. Highlighting the item can be in response to physical contact between an external actor and the input device.

Figure 11:
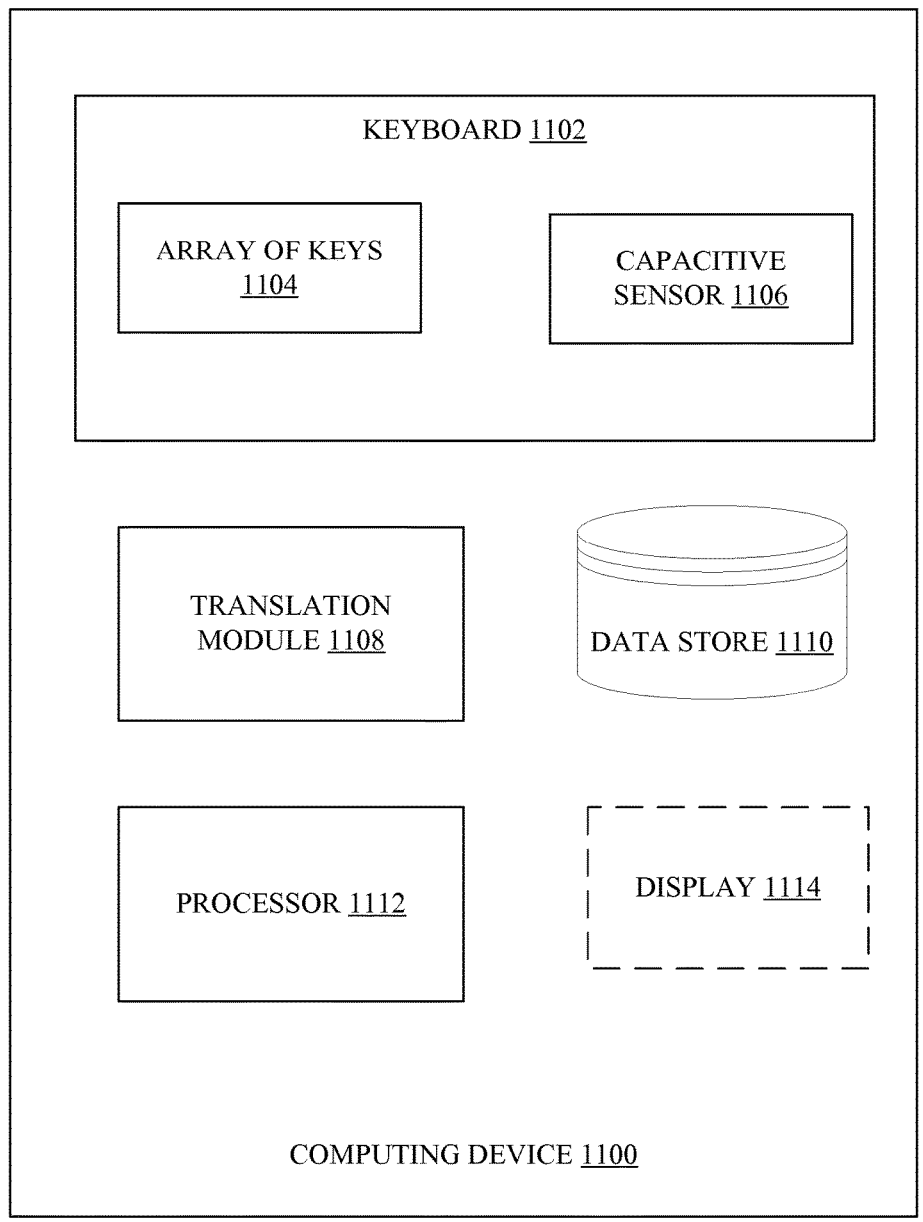
FIG. 11 is a block diagram of an example, non-limiting embodiment of a gesture keyboard computing device in accordance with at least some aspects of the subject disclosure.

FIG. 11 is a block diagram of an example, non-limiting embodiment of a gesture keyboard computing device in accordance with at least some aspects of the subject disclosure. As shown, a computing device 1100 can include a keyboard 1102. In an example, the keyboard 1102 is configured to detect an electrical contact between the finger and at least the subset of keys to receive interaction information from a capacitive interaction, a conductive interaction, or a mechanical interaction.

The keyboard 1102 can include an array of keys 1104, in which at least a subset of keys of the array of keys include a respective displacement actuated switch configured to detect pressure applied to a respective key of at least the subset of keys. The keyboard 1102 can also include at least one capacitive sensor 1106. The at least one capacitive sensor 1106 is configured to detect a finger near the keyboard 1102.

The computing device 1100 also include a translation module 1108 configured to translate a gesture near the keyboard 1102 into a command. In an example, the translation module 1108 is further configured to access a data store 1110 that includes a set of command gestures corresponding to different commands. In an example, the data store 1110 includes a set of common proximity-level gestures that are distinguishable from the set of command gestures.

Computing device 1100 also includes a processor 1112 configured to change a display 1114 as a function of the command. In an example, the display 1114 is a remote virtual display and the processor 1112 is further configured to generate signals and transmit the signals to the remote virtual display.

As discussed herein, various aspects related to a gesture keyboard can be implemented without a physical display and can be utilized with a folding or roll-up keyboard that is easy to carry. The compact system be can easily be used in awkward locations, such as on airplanes. However, the various aspects are also compatible with interim laptop computers having real (e.g., physical) displays. The various aspects, with the use of spectacles can provide a virtual-reality device that superimposes text and a keyboard image onto the real world. This can permit typing notes during a meeting without having to divide attention between the person talking and the textual notes being taken. The notes can be confidential since they are not rendered on a screen.

In various aspects, the keyboard can be smaller than conventional keyboards, since many keys are not utilized and/or not included on the keyboard. Further, large gestures can be utilized with the disclosed aspects, which can mitigate an amount of mistakes, extra work, and aggravation. For example, the user does not have to remove his hands from the typing position in order to make the commands, because the gestures are right above the keyboard. Further, the disclosed aspects provide for fast hand alignment for touch-typing, with highlighted keys triggered by light contact. The user does not need to glance at the keyboard to orient her hands, because the hand position is evident on the display. In another example, the disclosed aspects provide a large number of gestures, which are scalable, meaning that the size of the gesture can be translated into part of the command. The commands can be used for all ordinary commands of degree (e.g., cursor control, display motions) and also for discrete commands that do not incorporate any magnitude (e.g., shift lock, etc.).

Example Computing Environment

Figure 12:
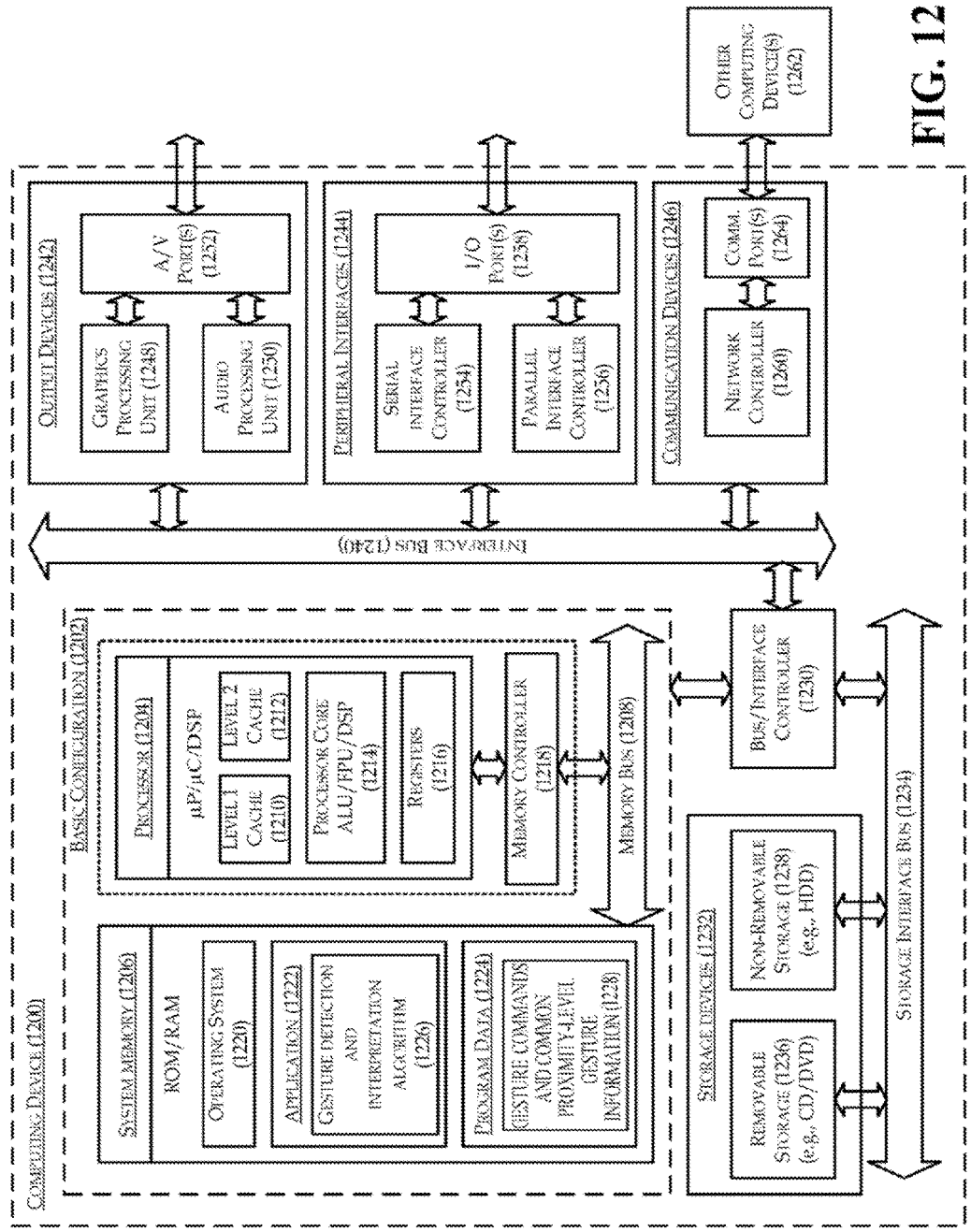
FIG. 12 is a block diagram illustrating an example computing device that is arranged for a gesture based keyboard in accordance with at least some embodiments of the subject disclosure.

FIG. 12 is a block diagram illustrating an example computing device 1200 that is arranged for a gesture based keyboard in accordance with at least some embodiments of the subject disclosure. In a very basic configuration 1202, computing device 1200 typically includes one or more processors 1204 and a system memory 1206. A memory bus 1208 may be used for communicating between processor 1204 and system memory 1206.

Depending on the desired configuration, processor 1204 may be of any type including but not limited to a microprocessor (W), a microcontroller (1E), a digital signal processor (DSP), or any combination thereof. Processor 1204 may include one more levels of caching, such as a level one cache 1210 and a level two cache 1212, a processor core 1214, and registers 1216. An example processor core 1214 may include an arithmetic logic unit (ALU), a floating point unit (FPU), a digital signal processing core (DSP Core), or any combination thereof. An example memory controller 1218 may also be used with processor 1204, or in some implementations memory controller 1218 may be an internal part of processor 1204.

Depending on the desired configuration, system memory 1206 may be of any type including but not limited to volatile memory (such as RAM), non-volatile memory (such as ROM, flash memory, etc.) or any combination thereof. System memory 1206 may include an operating system 1220, one or more applications 1222, and program data 1224. Application 1222 may include a gesture detection and interpretation algorithm 1226 that is arranged to perform the functions as described herein including those described with respect to gesture-based system 400 of FIG. 4. Program data 1224 may include gesture commands and common proximity-level gesture information 1228 that may be useful for operation with gesture detection and interpretation algorithm 1226 as is described herein. In some embodiments, application 1222 may be arranged to operate with program data 1224 on operating system 1220 such that a gesture based keyboard and an augmented virtual reality experience may be provided. This described basic configuration 1202 is illustrated in FIG. 12 by those components within the inner dashed line.

Computing device 1200 may have additional features or functionality, and additional interfaces to facilitate communications between basic configuration 1202 and any required devices and interfaces. For example, a bus/interface controller 1230 may be used to facilitate communications between basic configuration 1202 and one or more data storage devices 1232 via a storage interface bus 1234. Data storage devices 1232 may be removable storage devices 1236, non-removable storage devices 1238, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 1206, removable storage devices 1236, and non-removable storage devices 1238 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 1200. Any such computer storage media may be part of computing device 1200.

Computing device 1200 may also include an interface bus 1240 for facilitating communication from various interface devices (e.g., output devices 1242, peripheral interfaces 1244, and communication devices 1246) to basic configuration 1202 via bus/interface controller 1230. Example output devices 1242 include a graphics processing unit 1248 and an audio processing unit 1250, which may be configured to communicate to various external devices such as a display or speakers via one or more A/V ports 1252. Example peripheral interfaces 1244 include a serial interface controller 1254 or a parallel interface controller 1256, which may be configured to communicate with external devices such as input devices (e.g., mouse, pen, voice input device, etc.) or other peripheral devices (e.g., printer, scanner, etc.) via one or more I/O ports 1258. An example communication device 1246 includes a network controller 1260, which may be arranged to facilitate communications with one or more other computing devices 1262 over a network communication link via one or more communication ports 1264.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The subject disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The subject disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While the various aspects have been elaborated by various figures and corresponding descriptions, features described in relation to one figure are included in the aspects as shown and described in the other figures. Merely as one example, the "virtual barrier" described in relation to FIG. 5 is also a feature in the aspect as shown in FIG. 2, FIG. 3, and so forth.

From the foregoing, it will be appreciated that various embodiments of the subject disclosure have been described herein for purposes of illustration, and that various modifications may be made without departing from the scope and spirit of the subject disclosure. Accordingly, the various embodiments disclosed herein are not intended to be limiting, with the true scope and spirit being indicated by the following claims.

What is claimed is:

1. A method, comprising:
   receiving sensory information associated with an object in proximity to, or in contact with, an input device including receiving at least three different levels of interaction differentiation comprising a proximity level of interaction differentiation, an electrical continuity level of interaction differentiation, and an actuation level of interaction differentiation;
   analyzing the at least one level of interaction differentiation, comprising:
      determining the proximity level of interaction differentiation as a function of capacitance between the object and the input device, wherein the proximity level of interaction differentiation identifies a lateral position of the object with respect to the input device and a height of the object above a plane of the input device based on a trigonometric function of a first beat frequency in a first resonant circuit associated with a first character input component of the input device and a second beat frequency in a second resonant circuit associated with a second character input component of the input device,
      sensing the electrical continuity level of interaction differentiation based on detection of an electrical contact between a surface of at least one component of the input device and the object, and
      determining the actuation level of interaction differentiation based on movement of at least a portion of the input device by the object;
   determining a command from the sensory information based on a combination of the at least three levels of interaction differentiation, wherein a respective command for each combination of the at least three levels of interaction differentiation is distinguishable from other respective commands for other combinations of the at least three levels of interaction differentiation, comprising interpreting the command selected from different sets of commands based on whether the interaction differentiation is the proximity level, the electrical continuity level, or the actuation level; and
   outputting an action indication based on the command.

2. The method of claim 1, wherein the ascertaining the height comprises:
comparing a first resonant frequency of a first component of the input device to a second resonant frequency of a second component of the input device to determine a lowest resonant frequency of the first resonant frequency and the second resonant frequency; and
measuring a distance between the object and the input device based on the lowest resonant frequency including determining that the object is closer to the first component or the second component based on the lowest resonant frequency.

3. The method of claim 1, wherein the ascertaining the height comprises:
comparing responses of components of the input device; and
applying the trigonometric function to the responses to ascertain the height of the object indirectly.

4. The method of claim 1, wherein the locating the lateral position comprises:
determining a first resonant frequency of a first component of the input device and a second resonant frequency of a second component of the input device; and
determining the lateral position as a function of a local minima between the first resonant frequency and the second resonant frequency.

5. The method of claim 1, wherein the locating the lateral position comprises:
detecting a difference between a first resonant frequency of a first component and a second resonant frequency of a second component adjacent to the first component; and
determining that the object is closer to the first component or the second component as a function of the difference.

6. The method of claim 1, wherein the outputting the action indication comprises highlighting an item on a virtual display that comprises a first portion and a second portion, wherein the first portion comprises the command associated with the action indication and the second portion comprises a virtual representation of the input device.

7. The method of claim 6, wherein the highlighting the item is performed in response to the object being in physical contact with the input device.

8. The method of claim 1, wherein the receiving sensory information comprises:
detecting two or more objects in proximity to, or in contact with, the input device at a same time; and
identifying the two or more objects as a single object for purposes of a gesture command, wherein the receiving the sensory information includes receiving the sensory information associated with the single object.

9. The method of claim 1, wherein the outputting the action indication comprises transmitting, to a display device, a signal including the action indication and an interpretation of the command for output by the display device.

10. The method of claim 1, wherein the determining the command comprises interpolating motion of the object.

11. The method of claim 10, wherein the interpolating comprises:
receiving data from a plurality of components of the input device; and
based on the data, constructing a smooth line to locate the object.

12. A system, comprising:
a processor, coupled to a memory, configured to execute or facilitate execution of computer-executable instructions to perform operations, the operations comprising:
receiving at least one gesture within a space relative to a keyboard comprising a plurality of keys;
identifying a command based on the at least one gesture, wherein the command is selected from a set of alternative commands determined as a function of a combination of inputs received from one or more of an electrical continuity level sensed based on ground information related to a grounding of a surface of a key of the plurality of keys by an object, a proximity detected from movement of the object based on identifying a lateral location of the object with respect to the keyboard and a height of the object above a plane of the keyboard based on a trigonometric function of a first beat frequency of a first resonant circuit associated with a first key of the plurality of keys and a second beat frequency of a second resonant circuit associated with a second key of the plurality of keys, and an actuation detected from movement of the key of the plurality of keys by the object, wherein the set of alternative commands are different for different combinations of the electrical continuity level, the proximity, and the actuation; and
rendering information of the at least one gesture and a result of the command, wherein the information is configured to be rendered on a virtual display.

13. The system of claim 12, wherein the operations further comprise ascertaining the proximity by detecting cursor control and is configured to ascertain that a mechanical actuation indicates manual commands, and wherein the electrical continuity facilitates a highlighting of a key in the virtual display.

14. The system of claim 12, wherein the operations further comprise detecting the movement in the space relative to and near the keyboard and detect pressure applied to the keyboard.

15. The system of claim 14, wherein the operations further comprise highlighting at least a portion of the virtual display in response to detection of the pressure applied to the keyboard.

16. The system of claim 12, further comprising a sensor configured to measure a capacitance, wherein the operations further comprise determining the height and the lateral location of the object above the keyboard based on the capacitance.

17. The system of claim 16, wherein the object and a key of the keyboard form a capacitor of a resonant circuit, and wherein the capacitance between the object and the key is proportional to 1/d, where d is a separation in units of one-half a size of the object and the key, and wherein a frequency of the resonant circuit is a measure of distance.

18. The system of claim 16, wherein the operations further comprise measuring a beat frequency that represents an extent to which the object is closer to a first key than to a second key in a key pair.

19. The system of claim 18, wherein the beat frequency of the first key and the second key disappears in response to the object being between the first key and the second key.

20. The system of claim 12, wherein the virtual display comprises augmented reality spectacles.

21. A non-transitory computer-readable storage device storing executable instructions that, in response to execution, cause a system comprising a processor to perform operations, comprising:
detecting a gesture that indicates at least one command to be performed comprising receiving data indicative of an electrical continuity level based on detection of an electrical contact between a surface of a conductive key on a keyboard and an external element, wherein the data is received in response to the conductive key being determined not to be actuated for typing;

determining the gesture is the at least one command selected from a plurality of commands associated with the electrical continuity level, wherein the plurality of commands are different from a set of commands associated a combination of inputs associated with actuation of the conductive key and data indicative of a proximity level based on a capacitance between the external element and the keyboard, wherein the proximity level identifies a lateral position of the external element with respect to the keyboard and a height of the external element above a plane of the keyboard based on a trigonometric function of a first beat frequency in a first resonant circuit associated with a first key on the keyboard and a second beat frequency in a second resonant circuit associated with a second key on the keyboard; and initiating a result of the at least one command as a perceivable event within a virtual space.

22. The non-transitory computer-readable storage device of claim 21, wherein the detecting the gesture further comprises:

distinguishing the gesture that indicates the at least one command from a set of common proximity-level gestures, wherein the set of common proximity-level gestures are ignored.

23. The non-transitory computer-readable storage device of claim 21, wherein the detecting the gesture further comprises:

receiving an actuation that indicates the electrical contact between the external element and the conductive key of the keyboard.

24. The non-transitory computer-readable storage device of claim 21, wherein the detecting the gesture further comprises:

comparing a first resonant frequency of a first conductive actuation key of an input device with a second resonant frequency of a second conductive actuation key of the input device to determine a lowest resonant frequency of the first resonant frequency and the second resonant frequency; and measuring a distance between the external element and the input device based on the lowest resonant frequency including determining that the external element is closer to the first conductive actuation key or the second conductive actuation key based on the lowest resonant frequency.

25. The non-transitory computer-readable storage device of claim 21, wherein the detecting the gesture further comprises:

determining a first resonant frequency of a first conductive actuation key of an input device and a second resonant frequency of a second conductive actuation key of the input device; and determining the lateral position of the external element as a function of a local minima between the first resonant frequency and the second resonant frequency.

26. The non-transitory computer-readable storage device of claim 21, wherein the interpreting the gesture comprises ascertaining the gesture is at least one of a sweep gesture, a push-pull gesture, a circle gesture, a deflection gesture, an expansion-contraction gesture, or a rotating gesture.

27. The non-transitory computer-readable storage device of claim 21, wherein the initiating the result comprises highlighting an item on a virtual display that comprises a first portion and a second portion, illustrating a command associated with the gesture by the first portion, and presenting a representation of an input device by the second portion.

28. The non-transitory computer-readable storage device of claim 27, wherein the highlighting the item is in response to physical contact between the external element and the input device.

29. A device, comprising:
a keyboard comprising:
an array of keys, wherein at least a subset of keys of the array of keys comprise a respective displacement actuated switch configured to detect pressure applied to a respective key of at least the subset of keys and wherein at least the subset of keys comprise respective conductive touch surfaces; and
at least one capacitive sensor comprising two or more resonant circuits, configured to detect an object near the keyboard based on identifying a lateral position of the object with respect to the keyboard and a height of the object above a plane of the keyboard based on a trigonometric function of a first beat frequency of a first resonant circuit associated with a key of the array of keys and a second beat frequency of a second resonant circuit associated with another key of the array of keys;
an electrical contact sensor that detects an electrical continuity in relation to the object touching a conductive touch surface without application of at least a threshold pressure to the keyboard;
a processor, coupled to a memory, configured to execute or facilitate execution of computer-executable instructions to perform operations, the operations comprising:
translating a gesture near, or applied to, the keyboard into a command, wherein the command is based on a combination of inputs associated with the pressure, the object, and the electrical continuity selected from a set of commands associated with the pressure, the object, and the object touching the conductive surface, wherein respective commands of the first set of commands are based on different combinations of input; and
changing a display as a function of the command.

30. The device of claim 29, wherein the keyboard is configured to detect an electrical contact between the object and at least the subset of keys to receive interaction information from a capacitive interaction, a conductive interaction, or a mechanical interaction.

31. The device of claim 29, wherein the display is a remote virtual display and the processor is further configured to generate signals and transmit the signals to the remote virtual display.

32. The device of claim 29, wherein the operations further comprise accessing a data store that comprises information representing a set of command gestures corresponding to different commands.

33. The device of claim 32, wherein the data store further comprises other information representing a set of common proximity-level gestures that are distinguishable from the set of command gestures.

34. The method of claim 1, wherein the determining the command comprises selecting the command from a plurality of command gestures, wherein each command gesture from the plurality of command gestures corresponds to a different command.

35. The method of claim 34, wherein the plurality of command gestures comprise a set of proximity-level gesture commands and a set of command gestures.

36. The non-transitory computer-readable storage device of claim 21, wherein the operations further comprise:
  measuring a beat frequency that represents an extent to which the object is closer to a first key than to a second key in a key pair.

37. The method of claim 1, further comprising:
  measuring a beat frequency that represents an extent to which the object is closer to a first key than to a second key in a key pair.

38. The method of claim 3, wherein the applying the trigonometric function further comprises applying the trigonometric function based on a location of the components of the input device.

* * * * *

UNITED STATES PATENT AND TRADEMARK OFFICE
CERTIFICATE OF CORRECTION

PATENT NO.         : 9,547,438 B2                                   Page 1 of 1
APPLICATION NO.    : 13/320904
DATED              : January 17, 2017
INVENTOR(S)        : Bromer It is certified that error appears in the above-identified patent and that said Letters Patent is hereby corrected as shown below:

In the Specification

In Column 1, Line 8, delete "§371" and insert -- § 371 --, therefor.

In Column 6, Line 54, delete "key board" and insert -- keyboard --, therefor.

In Column 23, Line 44, delete "processor (W), a microcontroller (lE)," and insert -- processor (µP), a microcontroller (µC), --, therefor.

In the Claims

In Column 30, Line 65, in Claim 21, delete "performed" and insert -- performed, --, therefor.

Signed and Sealed this
Fourth Day of April, 2017

Michelle K. Lee
*Director of the United States Patent and Trademark Office*